US012281286B2

(12) United States Patent
Emiru et al.

(10) Patent No.: US 12,281,286 B2
(45) **Date of Patent: *Apr. 22, 2025**

(54) REDUCED MIST ALKALINE CLEANER VIA THE USE OF ALKALI SOLUBLE EMULSION POLYMERS

(71) Applicant: ECOLAB USA INC., Saint Paul, MN (US)

(72) Inventors: Hilina Emiru, Saint Paul, MN (US); Victor Fuk-Pong Man, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/499,324

(22) Filed: Nov. 1, 2023

(65) Prior Publication Data

US 2024/0076578 A1 Mar. 7, 2024

Related U.S. Application Data

(63) Continuation of application No. 16/946,944, filed on Jul. 13, 2020, now Pat. No. 11,834,633.

(Continued)

(51) Int. Cl.

| | |
|---|---|
| ***C11D 1/12*** | (2006.01) |
| ***B08B 3/04*** | (2006.01) |

(Continued)

(52) U.S. Cl.

CPC .............. *C11D 3/3765* (2013.01); *B08B 3/08* (2013.01); *C11D 1/94* (2013.01); *C11D 3/0073* (2013.01);

(Continued)

(58) Field of Classification Search

CPC ........... C11D 1/12; C11D 1/662; C11D 1/665; C11D 1/90; C11D 1/92; C11D 3/044;

(Continued)

(56) References Cited

U.S. PATENT DOCUMENTS

| | | | |
|---|---|---|---|
| 3,644,210 | A | 2/1972 | Crotty et al. |
| 3,658,988 | A | 4/1972 | Scher |

(Continued)

FOREIGN PATENT DOCUMENTS

| | | | |
|---|---|---|---|
| BG | 65638 | B1 | 4/2009 |
| CA | 1085238 | A | 9/1980 |

(Continued)

OTHER PUBLICATIONS

International Searching Authority, “International Search Report and Written Opinion of the International Searching Authority, or the Declaration”, in connection with PCT/US2020/041772, filed Jul. 13, 2020, 14 pages, mailed Oct. 25, 2020.

(Continued)

*Primary Examiner* — Brian P Mruk

(74) *Attorney, Agent, or Firm* — McKee, Voorhees & Sease, PLC

(57) ABSTRACT

Alkaline sprayable aqueous compositions for cleaning, sanitizing and disinfecting are disclosed. In particular, the sprayable compositions include an alkali soluble emulsion polymer, an alkalinity source, a foaming agent, and water. Beneficially, the sprayable cleaning compoistions have reduced misting and are environmentally safe for users to apply. Further the compositions exhibit less running on non-horizontal surfaces than acrylamide-based compositions.

20 Claims, 4 Drawing Sheets

Related U.S. Application Data

(60) Provisional application No. 62/873,276, filed on Jul. 12, 2019.

(51) Int. Cl.

| | |
|---|---|
| ***B08B 3/08*** | (2006.01) |
| ***C11D 1/90*** | (2006.01) |
| ***C11D 1/92*** | (2006.01) |
| ***C11D 1/94*** | (2006.01) |
| ***C11D 3/00*** | (2006.01) |
| ***C11D 3/22*** | (2006.01) |
| ***C11D 3/30*** | (2006.01) |
| ***C11D 3/37*** | (2006.01) |
| ***C11D 3/43*** | (2006.01) |
| ***C11D 17/00*** | (2006.01) |

(52) U.S. Cl.
CPC ............ *C11D 3/0094* (2013.01); *C11D 3/221* (2013.01); *C11D 3/222* (2013.01); *C11D 3/43* (2013.01); *C11D 17/0043* (2013.01); *C11D 2111/14* (2024.01)

(58) Field of Classification Search
CPC ......... C11D 3/2006; C11D 3/22; C11D 3/222; B08B 3/04
See application file for complete search history.

(56) References Cited

U.S. PATENT DOCUMENTS 3,779,933 A 12/1973 Eisen
3,813,343 A 5/1974 Mukai et al.
3,829,387 A 8/1974 Wise et al.
4,140,516 A 2/1979 Scher
4,214,915 A 7/1980 Dillarstone et al.
4,314,841 A 2/1982 Scher
4,357,351 A 11/1982 Fancher et al.
4,425,241 A 1/1984 Swanson
4,426,362 A 1/1984 Copeland et al.
4,440,563 A 4/1984 Scher
4,492,646 A 1/1985 Welch
4,500,494 A 2/1985 Scher
4,510,081 A 4/1985 Bronner et al.
4,515,813 A 5/1985 Fancher et al.
4,529,773 A 7/1985 Witiak et al.
4,618,914 A 10/1986 Sato et al.
4,647,258 A 3/1987 Massarsch
4,654,161 A 3/1987 Kollmeier et al.
4,673,704 A 6/1987 Flesher et al.
4,676,920 A 6/1987 Culshaw
4,687,121 A 8/1987 Copeland
4,690,305 A 9/1987 Copeland
4,767,563 A 8/1988 de Buzzaccarini
RE32,763 E 10/1988 Fernholtz et al.
4,778,836 A 10/1988 Farrar et al.
RE32,818 E 1/1989 Fernholtz et al.
4,826,661 A 5/1989 Copeland et al.
4,830,773 A 5/1989 Olson
4,877,691 A 10/1989 Cockrell, Jr.
4,898,611 A 2/1990 Gross
4,913,775 A 4/1990 Langley et al.
4,929,655 A 5/1990 Takeda et al.
4,933,167 A 6/1990 Scher et al.
4,950,725 A 8/1990 Flesher et al.
4,956,129 A 9/1990 Scher et al.
5,110,883 A 5/1992 Gartner
5,120,542 A 6/1992 Scher et al.
5,134,961 A 8/1992 Giles et al.
5,171,783 A 12/1992 Gartner
5,332,584 A 7/1994 Scher et al.
5,364,551 A 11/1994 Lentsch et al.
5,393,381 A 2/1995 Hund et al.
5,397,506 A 3/1995 Groth et al.
5,454,984 A 10/1995 Graubart et al.
5,474,698 A 12/1995 Rolando et al.
5,501,815 A 3/1996 Man
5,518,634 A 5/1996 Pillai et al.
5,589,099 A 12/1996 Baum
5,601,723 A 2/1997 Kirk et al.
5,603,776 A 2/1997 Lentsch et al.
5,674,831 A 10/1997 Schulz et al.
5,700,771 A 12/1997 Hardy et al.
5,876,514 A 3/1999 Rolando et al.
5,880,089 A 3/1999 Lentsch et al.
5,912,207 A 6/1999 Scher et al.
5,945,494 A 8/1999 Neff et al.
6,103,839 A 8/2000 Patel et al.
6,258,765 B1 7/2001 Wei et al.
6,268,325 B1 7/2001 Luciani et al.
6,294,515 B1 9/2001 Baum
6,294,622 B1 9/2001 Barajas et al.
6,372,842 B1 4/2002 Grisso et al.
6,485,736 B1 11/2002 Shirley et al.
6,530,383 B1 3/2003 Rogmann et al.
6,537,961 B1 3/2003 Koch
6,541,422 B2 4/2003 Scher et al.
6,544,540 B2 4/2003 Van Koppenhagen et al.
6,605,674 B1 8/2003 Whipple et al.
RE38,262 E 10/2003 Rolando et al.
6,750,190 B2 6/2004 Colurciello et al.
6,753,388 B1 6/2004 Whipple et al.
6,770,612 B1 8/2004 Hatchman
6,956,019 B2 10/2005 Lentsch et al.
7,271,200 B2 9/2007 Scher et al.
7,278,294 B2 10/2007 Giles et al.
7,279,455 B2 10/2007 Kieffer et al.
7,311,004 B2 12/2007 Giles
7,502,665 B2 3/2009 Giles et al.
7,566,448 B2 7/2009 Becker et al.
7,592,301 B2 9/2009 Smith et al.
7,665,348 B2 2/2010 Giles
7,742,842 B2 6/2010 Giles et al.
7,826,930 B2 11/2010 Giles et al.
8,097,687 B2 1/2012 Kurian et al.
8,109,448 B2 2/2012 Giles
8,173,159 B2 5/2012 Scher et al.
8,250,907 B2 8/2012 Giles
8,865,632 B1 10/2014 Parnell et al.
8,916,508 B2 12/2014 Parnell et al.
9,127,241 B2 9/2015 Hodge et al.
9,206,381 B2 12/2015 Hodge et al.
10,392,587 B2 8/2019 Man et al.
11,008,538 B2 5/2021 Man et al.
11,834,633 B2 * 12/2023 Emiru ..................... C11D 3/43
2002/0037306 A1 3/2002 Van Koppenhagen et al.
2002/0069901 A1 6/2002 Evers
2002/0192340 A1 12/2002 Swart et al.
2003/0109403 A1 6/2003 Man et al.
2003/0119689 A1 6/2003 Hutton et al.
2003/0171243 A1 9/2003 Kischkel et al.
2004/0033269 A1 2/2004 Hei et al.
2004/0157760 A1 8/2004 Man et al.
2004/0224867 A1 11/2004 Colurciello et al.
2006/0246242 A1 11/2006 Siegel et al.
2007/0043119 A1 2/2007 Graeber et al.
2007/0253926 A1 11/2007 Tadrowski et al.
2007/0264344 A1 11/2007 Segura-Orsoni et al.
2008/0230624 A1 9/2008 Giles et al.
2008/0293615 A1 11/2008 Kieffer et al.
2009/0035339 A1 2/2009 Istvan et al.
2009/0111716 A1 4/2009 Hough et al.
2009/0196897 A1 8/2009 Gladfelter et al.
2010/0009886 A1 1/2010 Smith et al.
2010/0286019 A1 11/2010 Scher et al.
2010/0294498 A1 11/2010 Svoboda et al.
2010/0300044 A1 12/2010 Man et al.
2011/0092398 A1 4/2011 Dahanayake et al.
2012/0168532 A1 7/2012 Giles
2013/0172228 A1 7/2013 Bartelme et al.
2013/0255729 A1 10/2013 Hodge et al.
2013/0284205 A1 10/2013 Hodge et al.
2014/0148371 A1 5/2014 Man et al.

(56) References Cited

U.S. PATENT DOCUMENTS

| | | | |
|---|---|---|---|
| 2014/0148372 A1 | 5/2014 | Man et al. | |
| 2017/0335253 A1* | 11/2017 | Man | C11D 17/0043 |
| 2017/0335254 A1 | 11/2017 | Man et al. | |

FOREIGN PATENT DOCUMENTS

| | | | |
|---|---|---|---|
| CA | 1199808 | A | 1/1986 |
| CA | 2101641 | C | 8/1992 |
| CA | 1317875 | C | 5/1993 |
| CA | 2122956 | A1 | 11/1994 |
| CA | 2245537 | C | 8/1997 |
| CA | 2276364 | A1 | 7/1998 |
| CA | 2339013 | A1 | 2/2000 |
| CA | 2376679 | A1 | 3/2001 |
| CA | 2405977 | A1 | 12/2001 |
| CA | 2447759 | A1 | 12/2002 |
| CA | 2493361 | A1 | 2/2004 |
| CA | 2512324 | A1 | 1/2007 |
| DE | 69918694 | T2 | 7/2005 |
| EP | 0005302 | A2 | 11/1979 |
| EP | 0085327 | A1 | 8/1983 |
| EP | 0089213 | A2 | 9/1983 |
| EP | 0202780 | A2 | 11/1986 |
| EP | 0363024 | A1 | 4/1990 |
| EP | 0374458 | A2 | 6/1990 |
| EP | 0411218 | A1 | 2/1991 |
| EP | 0523198 | B1 | 1/1993 |
| EP | 0623052 | B1 | 11/1994 |
| EP | 0787778 | A1 | 8/1997 |
| EP | 1103017 | B1 | 5/2001 |
| EP | 1102834 | B1 | 7/2004 |
| GB | 2306965 | A | 5/1997 |
| JP | 2009111294 | A | 5/2009 |
| JP | 2009296121 | A | 12/2009 |
| JP | 2017078129 | A | 4/2017 |
| WO | 198002024 | A1 | 10/1980 |
| WO | 8911525 | A1 | 11/1989 |
| WO | 9210093 | A1 | 6/1992 |
| WO | 9213448 | A1 | 8/1992 |
| WO | 9314865 | A1 | 8/1993 |
| WO | 9516023 | A1 | 6/1995 |
| WO | 9707675 | A1 | 3/1997 |
| WO | 199711147 | A1 | 3/1997 |
| WO | 9727748 | A1 | 8/1997 |
| WO | 9739089 | A1 | 10/1997 |
| WO | 9828975 | A1 | 7/1998 |
| WO | 0005951 | A1 | 2/2000 |
| WO | 0005952 | A1 | 2/2000 |
| WO | 0008125 | A1 | 2/2000 |
| WO | 0046327 | A1 | 8/2000 |
| WO | 200100779 | A1 | 1/2001 |
| WO | 0119509 | A1 | 3/2001 |
| WO | 0183879 | A1 | 11/2001 |
| WO | 200202662 | A1 | 1/2002 |
| WO | 0248299 | A1 | 6/2002 |
| WO | 02100374 | A2 | 12/2002 |
| WO | 02100525 | A2 | 12/2002 |
| WO | 2003027218 | A1 | 4/2003 |
| WO | 2004010930 | A2 | 2/2004 |
| WO | 2005085321 | A1 | 9/2005 |
| WO | 2007104895 | A1 | 9/2007 |
| WO | 2009143513 | A1 | 11/2009 |
| WO | 2010091333 | A2 | 8/2010 |
| WO | 2010091345 | A2 | 8/2010 |
| WO | 2011036053 | A1 | 3/2011 |
| WO | 2013043699 | A2 | 3/2013 |
| WO | 2013064315 | A1 | 5/2013 |
| WO | 2017102868 | A1 | 6/2017 |
| WO | 2020154347 | A1 | 7/2020 |

OTHER PUBLICATIONS

BASF Corporation, "Plurafac LF—221 Alcohol Alkoxylate", Technical Bulletin, 1 page, 2002.

Bozetine, I., et al., "Optimization of an Alkylpolyglucoside-Based Dishwashing Detergent Formulation", Journal of Surfactants and Detergents, 11, pp. 299-305, Dec. 2008.

Brüschweiler, Dr. H., "Flüssigwaschmittel", Tenside Detergents, BASF Corporation, 23, 6 pages, 1986.

Crowe et al., "Digital Device and Technique for Sensing Distribution of Spray Deposition", American Society of Agricultural Engineers, vol. 48(6): pp. 2085-2093, 2005.

Dexter, R. W., "Measurement of Extensional Viscosity of Polymer Solutions and Its Effects on Atomization from a Spray Nozzle", Atomization and Sprays, vol. 6, pp. 167-191, 1996.

DOW Personal Care, Kathon CG, "A Safe, Effective, Globally Approved Preservative for Rinse-Off Products" 9 pages, Jun. 2006.

Filipovic-Vincekovic et al., "Surfactants in Liquid Decontamination Processes", Tenside Surfactants Detergents, 24:3, pp. 167-172, 1987.

Giles et al. "Flow Control and Spray Cloud Dynamics from Hydraulic Atomizers", Transactions of the ASAE, vol. 45 (3), pp. 539-546, 2002.

Giles, D. Ken, "Independent Control of Liquid Flow Rate and Spray Droplet Size from Hydraulic Atomizers", Atomization and Sprays, vol. 7, pp. 161-181, 1997.

Giles et al. "Precision Band Spraying with Machine-Vision Guidance and Adjustable Yaw Nozzles", American Society of Agricultural Engineers, vol. 40(1), pp. 29-36, 1997.

Giles et al., "Suppression of Aerosol Generation During Spraying and Deposition of Consumer Products", Atomization and Sprays, vol. 15, 423-438, 2005.

Giles et al. "Transient Droplet Size Spectra from Trigger Sprayers Dispensing Aqueous Solutions", American Society of Agricultural Engineers, vol. 48(1), pp. 63-72, 2005.

Jadidi et al., "Synergism and Performance Optimization in Liquid Detergents Containing Binary Mixtures of Anionic-Cationic Surfactants", J. Surfact. Deterg., vol. 16, pp. 115-121, 2013.

Malihi et al., "Evaluation of Physico-Chemical Interactions between Linear Alkylbenzene Sulfonate (LAS) and Alcohol Ethoxylates", Physical Chemistry, Tenside Surf. Det. 48, 5, pp. 395-399, 2011.

Nalco Company, "Nalco 625 Liquid Anionic Flocculant", Product Bulletin, 3 pages, 2014.

Nalco Company, "Core Shell 61067 Paper Process Polymer", Product Bulletin, 5 pages, 2014.

Raney, Kirk H., "Optimization of Nonionic /Anionic Surfactant Blends for Enhanced Oily Soil Removal", JAOCS, vol. 68, No. 7, pp. 525-531, Jul. 1991.

Rojoranun et al., "Mechanistic Studies of Particulate Soil Detergency: I. Hydrophonic Soil Removal", J. Surfact. Deterg., vol. 15, pp. 277-289, 2012.

Rojvoranun et al., "Mechanistic Studies of Particulate Soil Detergency: II. Hydrophobic Soil Removal", J. Surfact. Deterg., vol. 15, pp. 663-677, 2012.

Zoid et al., "Response Surface Methodology as an Approach to the Optimization of a Dishwashing Detergent", Tenside Surf. Det., 44:2, pp. 94-101, 2007.

Potgieter et al., "Detergent and Cleaning Compositions Derived from New Detergent Alcohols", U.S. Statutory Invention Registration No. H1,818, 14 pages, published Nov. 2, 1999.

Office Action in CN202080050518.X, mailed Jan. 15, 2024, 25 pages.

* cited by examiner

REDUCED MIST ALKALINE CLEANER VIA THE USE OF ALKALI SOLUBLE EMULSION POLYMERS

CROSS-REFERENCE

This is a Continuation Application of U.S. Pat. No. 11,834,633, filed on Jul. 13, 2020, which claims priority under 35 U.S.C. § 119 to U.S. Provisional Application Ser. No. 62/873,276, filed on Jul. 12, 2019 and entitled "REDUCED MIST ALKALINE CLEANER VIA THE USE OF ALKALI SOLUBLE EMULSION POLYMERS"; each of which expressly incorporated herein by reference.

TECHNICAL FIELD

The application is related to the field of sprayable compositions for cleaning, sanitizing and disinfecting. The present invention is further related to sprayable compositions, including for example aerosol or pump spray, providing the benefits of reduced misting and therefore reduced inhalation. The sprayable compositions employ an alkali sprayable emulsion polymer.

BACKGROUND

Acidic and alkaline cleaning compositions for hard surfaces have been used for many years to remove stubborn soils from a variety of surfaces found in household and institutional locations. A variety of cleaning compositions have been developed to deal with the tenacious organic and organic/inorganic matrix soils common in a variety of surfaces. One particularly useful form of cleaner is an aqueous alkaline cleaner commonly delivered from a pressurized aerosol or pump spray device. These types of cleaners have great utility for a variety of surfaces because the material can be delivered by spray to vertical, overhead or inclined surfaces or to surfaces having a complex curved or convoluted surface while achieving substantially complete coverage of the surface with the spray-on liquid cleaner. Acid spray-on cleaners are also known for removing basic inorganic soils and are becoming more common.

Spray devices create a spray pattern of the composition that contacts the target hard surface. The majority of the composition comes to reside on the target surface, while a small portion of the sprayable composition may become an airborne aerosol or mist consisting of small particles (e.g. an airborne mist or finely divided aerosol) of the cleaning composition that can remain suspended or dispersed in the atmosphere surrounding the dispersal site for a period of time, such as between about 5 seconds to about 10 minutes. Such airborne mist or finely divided aerosol generated during the spraying process can present a substantial problem. Such aqueous compositions having a strong base cleaning component in the form of a finely divided aerosol or mist can cause respiratory distress in a user. To alleviate the respiratory distress, some sprayable aqueous compositions have been formulated with reduced quantities of the alkaline cleaning components. Strong caustic has been replaced by reduced alkalinity bases such as bicarbonate or by solvent materials. However, the reduction in concentration or substitution of these materials can often reduce the cleaning activity and effectiveness of the material when used. This necessitates the use of organic surfactants or glycol, alkyl ether or dimethyl sulfoxide solvent materials to enhance the detergent properties of the reduced alkaline materials. Despite improvements seen in sprayable aqueous compositions there remains a need for improved compositions having reduced misting and therefore reduced inhalation, while providing efficacious cleaning, sanitizing and disinfecting.

Development and improvements to polymers for various uses include those disclosed in EP 202,780 disclosing particulate cross-linked copolymers of acrylamide with at least 5 mole percent dialkylaminoalkyl acrylate; U.S. Pat. No. 4,950,725 disclosing the addition of a cross-linking agent both at the beginning, and during the polymerization process under conditions such that its availability for reaction is substantially constant throughout the process; EP 374,458 disclosing water-soluble branched low molecular weight cationic polymers; EP 363,024 disclosing chain transfer agent at the conclusion of polymerization of a DADMAC/acrylamide copolymer; U.S. Pat. No. 4,913,775 disclosing use of substantially linear cationic polymers such as acrylamide/dimethylaminoethyl acrylate methyl chloride quaternary salt copolymers; U.S. Pat. No. 5,393,381 disclosing branched cationic polyacrylamide powder such as an acrylamide/dimethylaminoethyl acrylate quaternary salt copolymer; and WO2002002662 disclosing water-soluble cationic, anionic, and nonionic polymers, synthesized using water-in-oil emulsion, dispersion, or gel polymerization and having a fast rate of solubilization, higher reduced specific viscosities.

There have been other efforts to reduce the misting of sprays with the hope of retaining cleaning properties. Such have included the use of Xanthan Gum for its high elongational viscosity. See U.S. Pat. No. 5,364,551. However, compositions including Xanthan Gum are extraordinarly difficult to process due the high shear viscosity, it would form fish eyes, and required specialized equipment and additional time for manufacturing. These difficulties increased the cost of production of products containing higher amounts of Xanthan Gum.

Other efforts to reduce the misting of sprays while retaining cleaning properties have been through the use of acrylamide and acrylamide-derivative polymers. While products were an improvement over prior technologies by providing reduced misting and easier processing, these compositions suffered their own difficultes. For example, due to the structure of these acrylamide and acrylamide-derivative polymers, these compositions suffer significant problems with running as the polymers tend to elongate after application.

Accordingly, it is an objective of this disclosure to provide reduced misting sprayable cleaning compositions that reduce and/or eliminate exposure to users mist or other small particles generated by the spraying of the composition.

A further object of this disclosure is to provide a reduced misting product with improved processing and manufacturing requirements to reduce the cost of manufacture.

Yet another object of this disclosure is to provide sprayable cleaning compositions with reduced misting that also exhibit reduced running.

A still further object of this disclosure is to provide methods of cleaning using the sprayable cleaning compositions to treat hard surfaces while reducing the amount of mist or other small particles generated by the spraying of the composition.

Other objects, advantages and features of the present invention will become apparent from the following specification taken in conjunction with the accompanying drawings.

BRIEF SUMMARY OF THE PREFERRED EMBODIMENTS

An advantage of the invention is provided by the sprayable compositions exhibiting reduced misting. It is an advantage the sprayable cleaning compoistions exhibit reduced running compared with sprayable compositions comprising acrylamides and acrylamide-derivatives. It is a further advantage that sprayable cleaning compositions are easier and more cost-effective to manufacture than the prior technology which employed higher concentrations of Xanthan Gum. Other advantages and benefits of the present invention will be apparent in the application.

A preferred embodiment comprises a sprayable cleaning composition comprising from about 0.0035 wt. % to about 1 wt. % of an alkali soluble emulsion polymer, wherein the alkali soluble emulsion polymer is in an emulsion where the continuous phase is water or a water miscible liquid, wherein the alkali soluble emulsion polymer is stable at a pH of at least about 10; an alkalinity source, wherein the alkalinity source is in a concentration sufficient to neutralize the alkali soluble emulsion polymer; from about 0.1 wt. % to about 10 wt. % of a foaming agent; wherein the foaming agent comprises an anionic surfactant, a nonionic surfactant, an amphoteric surfactant, or a combination thereof; wherein the composition is free of cationic surfactant; and water; wherein the sprayable cleaning composition reduces the formation of airborne aerosol particles having a micron size of less than about 10 when sprayed, and a use solution of the composition has a shear viscosity from about 1 to about 500 cps. In a preferred embodiment, the sprayable cleaning composition further comprises a corrosion inhibitor, a solvent, a thickener, or a combination thereof.

A preferred embodiment comprises a system for applying sprayable cleaning composition with reduced misting, the system comprising (a) a sprayer comprising a spray head connected to a spray bottle; and (b) the sprayable cleaning composition contained by the spray bottle and the spray head adapted to dispense the sprayable cleaning composition; wherein the sprayable cleaning composition comprises from about 0.0035 wt. % to about 1 wt. % of an alkali soluble emulsion polymer, wherein the alkali soluble emulsion polymer is in an emulsion where the continuous phase is water or a water miscible liquid, wherein the alkali soluble emulsion polymer is stable at a pH of at least about 10; an alkalinity source, wherein the alkalinity source is in a concentration sufficient to neutralize the alkali soluble emulsion polymer; from about 0.1 wt. % to about 10 wt. % of a foaming agent; wherein the foaming agent comprises an anionic surfactant, a nonionic surfactant, an amphoteric surfactant, or a combination thereof; wherein the composition is free of cationic surfactant; and water; wherein the sprayable cleaning composition reduces the formation of airborne aerosol particles having a micron size of less than about 10 when sprayed, and a use solution of the composition has a shear viscosity from about 1 to about 500 cps. In a preferred embodiment, the sprayable cleaning composition further comprises a corrosion inhibitor, a solvent, a thickener, or a combination thereof.

A preferred embodiment comprises a method of cleaning a hard surface using a sprayed, reduced misting, cleaning composition comprising (a) contacting a soiled surface with the sprayable cleaning composition, and (b) wiping the hard surface to remove film and/or any soil; wherein the sprayable cleaning composition comprises from about 0.0035 wt. % to about 1 wt. % of an alkali soluble emulsion polymer, wherein the alkali soluble emulsion polymer is in an emulsion where the continuous phase is water or a water miscible liquid, wherein the alkali soluble emulsion polymer is stable at a pH of at least about 10; an alkalinity source, wherein the alkalinity source is in a concentration sufficient to neutralize the alkali soluble emulsion polymer; from about 0.1 wt. % to about 10 wt. % of a foaming agent; wherein the foaming agent comprises an anionic surfactant, a nonionic surfactant, an amphoteric surfactant, or a combination thereof; wherein the composition is free of cationic surfactant; and water; wherein the sprayable cleaning composition reduces the formation of airborne aerosol particles having a micron size of less than about 10 when sprayed, and a use solution of the composition has a shear viscosity from about 1 to about 500 cps. In a preferred embodiment, the sprayable cleaning composition further comprises a corrosion inhibitor, a solvent, a thickener, or a combination thereof.

While multiple embodiments are disclosed, still other embodiments of the inventions will become apparent to those skilled in the art from the following detailed description, which shows and describes illustrative embodiments of the invention. Accordingly, the figures and detailed description are to be regarded as illustrative in nature and not restrictive.

Figure 1:
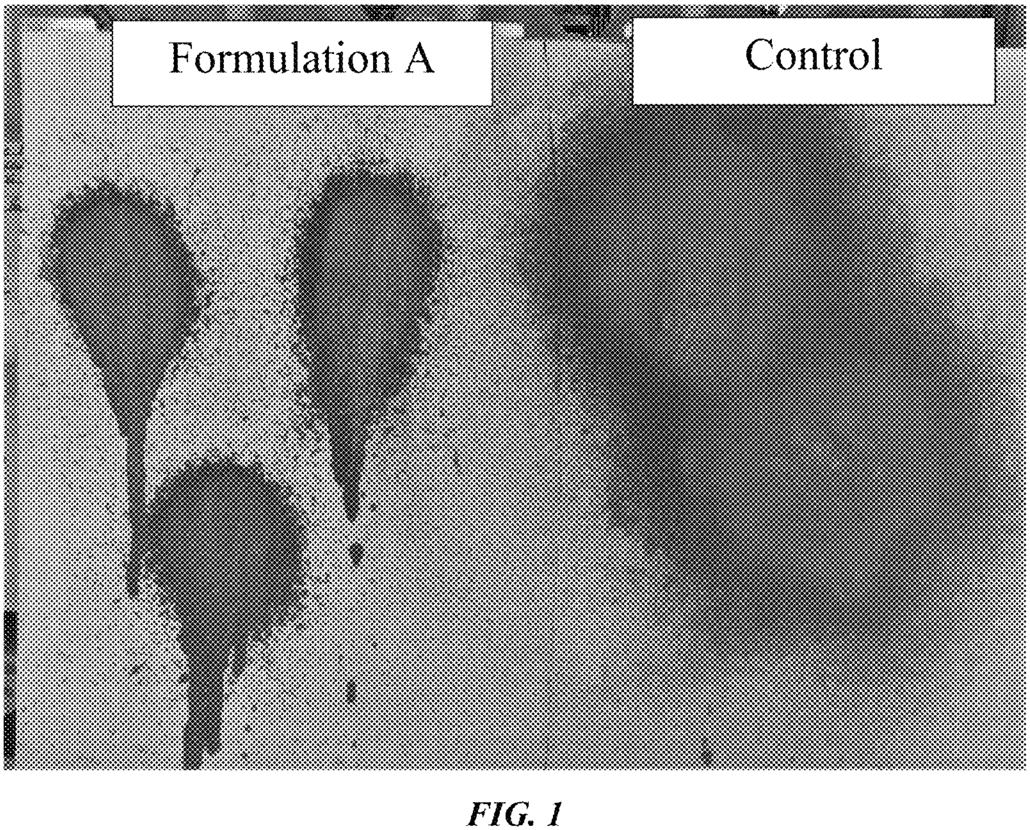
FIG. 1 shows the amount of misting and droplet size of a control cleaning composition having no alkali soluble emulsion polymers, versus an exemplary cleaning composition of the present application containing alkali soluble emulsion polymers.

Various embodiments of the present inventions will be described in detail with reference to the figures. Reference to various embodiments does not limit the scope of the invention. Figures represented herein are not limitations to the various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The present invention relates to reduced misting hard surface cleaning compositions. The reduced misting cleaning compositions have many advantages over conventional sprayable cleaning compositions. For example, the compositions reduce particulate matter and therefore inhalation by a user. In an aspect of the invention, the reduced misting sprayable cleaning compositions are delivered in micron sized particles that reduce inhalation, such as for example by delivering compositions at a particle size of at least about 10 microns to minimize the inhalation of particles. In a further aspect, the cleaning composition solutions produces a total concentration of misting of particles having a size of 10 microns or less within a breathing zone of a user of less than or equal to 60 particles/$cm^3$.

The embodiments of this invention are not limited to particular compositions, methods of making and/or methods of employing the same for hard surface cleaning, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range.

References to elements herein are intended to encompass any or all of their oxidative states and isotopes. For example discussion of aluminum can include $Al^{I}$, $Al^{II}$, or $A^{III}$ and references to boron include any of its isotopes, i.e., $^{6}B$, $^{7}B$, $^{8}B$, $^{9}B$, $^{10}B$, $^{11}B$, $^{12}B$, $^{13}B$, $^{14}B$, $^{15}B$, $^{16}B$, $^{17}B$, $^{18}B$, and $^{19}B$.

Definitions

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring techniques and equipment, with respect to any quantifiable variable, including, but not limited to, mass, volume, time, distance, temperature, size, length, viscosity, and conductivity. Further, given solid and liquid handling procedures used in the real world, there is certain inadvertent error and variation that is likely through differences in the manufacture, source, or purity of the ingredients used to make the compositions or carry out the methods and the like. The term "about" also encompasses these variations. Whether or not modified by the term "about," the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the terms "active chlorine", "chlorine", and "hypochlorite" are all used interchangeably and are intended to mean measureable chlorine available in a use solution as evaluated by standard titration techniques known to those of skill in the art. In a preferred embodiment, the sprayable cleaning compositions are chlorine-free.

As used herein, the terms "aerosol" and "mist" refer to airborne dispersions of small particles comprising the cleaning composition that can remain suspended or dispersed in the atmosphere surrounding a cleaning site for at least 5 seconds, more commonly 15 seconds to 10 minutes.

As used herein, the term "cleaning" refers to a method used to facilitate or aid in soil removal, bleaching, microbial population reduction, and any combination thereof. As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

As used herein, the term "disinfectant" refers to an agent that kills all vegetative cells including most recognized pathogenic microorganisms, using the procedure described in *A.O.A.C. Use Dilution Methods*, Official Methods of Analysis of the Association of Official Analytical Chemists, paragraph 955.14 and applicable sections, 15th Edition, 1990 (EPA Guideline 91-2). As used herein, the term "high level disinfection" or "high level disinfectant" refers to a compound or composition that kills substantially all organisms, except high levels of bacterial spores, and is effected with a chemical germicide cleared for marketing as a sterilant by the Food and Drug Administration. As used herein, the term "intermediate-level disinfection" or "intermediate level disinfectant" refers to a compound or composition that kills mycobacteria, most viruses, and bacteria with a chemical germicide registered as a tuberculocide by the Environmental Protection Agency (EPA). As used herein, the term "low-level disinfection" or "low level disinfectant" refers to a compound or composition that kills some viruses and bacteria with a chemical germicide registered as a hospital disinfectant by the EPA.

The term or abbreviation "EDTA 4Na+" refers to ethylenediaminetetraacetic acid, tetrasodium salt.

The term "hard surface" refers to a solid, substantially non-flexible surface such as a counter top, tile, floor, wall, panel, window, plumbing fixture, kitchen and bathroom furniture, appliance, engine, circuit board, and dish. Hard surfaces may include for example, health care surfaces and food processing surfaces.

As used herein, the phrase "health care surface" refers to a surface of an instrument, a device, a cart, a cage, furniture, a structure, a building, or the like that is employed as part of a health care activity. Examples of health care surfaces include surfaces of medical or dental instruments, of medical or dental devices, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bed-pans, etc.), or fabric surfaces, e.g., knit, woven, and non-woven surfaces (such as surgical garments, draperies, bed linens, bandages, etc.,), or patient-care equipment (such as respirators, diagnostic equipment, shunts, body scopes, wheel chairs, beds, etc.,), or surgical and diagnostic equipment. Health care surfaces include articles and surfaces employed in animal health care.

As used herein, the phrase "food processing surface" refers to a surface of a tool, a machine, equipment, a structure, a building, or the like that is employed as part of a food processing, preparation, or storage activity. Examples of food processing surfaces include surfaces of food processing or preparation equipment (e.g., slicing, canning, or transport equipment, including flumes), of food processing wares (e.g., utensils, dishware, wash ware, and bar glasses), and of floors, walls, or fixtures of structures in which food processing occurs. Food processing surfaces are found and employed in food anti-spoilage air circulation systems, aseptic packaging sanitizing, food refrigeration and cooler cleaners and sanitizers, ware washing sanitizing, blancher cleaning and sanitizing, food packaging materials, cutting board additives, third-sink sanitizing, beverage chillers and warmers, meat chilling or scalding waters, auto dish sanitizers, sanitizing gels, cooling towers, food processing antimicrobial garment sprays, and non-to-low-aqueous food preparation lubricants, oils, and rinse additives.

As used herein, the term "oligomer" refers to a molecular complex comprised of between one and ten monomeric units. For example, dimers, trimers, and tetramers, are considered oligomers. Furthermore, unless otherwise specifically limited, the term "oligomer" shall include all possible isomeric configurations of the molecule, including, but are not limited to isotactic, syndiotactic and random symmetries, and combinations thereof. Furthermore, unless otherwise specifically limited, the term "oligomer" shall include all possible geometrical configurations of the molecule.

As used herein the term "polymer" refers to a molecular complex comprised of a more than ten monomeric units and generally includes, but is not limited to, homopolymers, copolymers, such as for example, block, graft, random and alternating copolymers, terpolymers, and higher "x"mers, further including their analogs, derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule.For the purpose of this patent application, successful microbial reduction is achieved when the microbial populations are reduced by at least about 50%, or by significantly more than is achieved by a wash with water. Larger reductions in microbial population provide greater levels of protection.

As used herein, the term "sanitizer" refers to an agent that reduces the number of bacterial contaminants to safe levels as judged by public health requirements. In an embodiment, sanitizers for use in this invention will provide at least a 99.999% reduction (5-log order reduction). These reductions can be evaluated using a procedure set out in *Germicidal and Detergent Sanitizing Action of Disinfectants*, Official Methods of Analysis of the Association of Official Analytical Chemists, paragraph 960.09 and applicable sections, 15th Edition, 1990 (EPA Guideline 91-2). According to this reference a sanitizer should provide a 99.999% reduction (5-log order reduction) within 30 seconds at room temperature, 25±2° C., against several test organisms.

Differentiation of antimicrobial "-cidal" or "-static" activity, the definitions which describe the degree of efficacy, and the official laboratory protocols for measuring this efficacy are considerations for understanding the relevance of antimicrobial agents and compositions. Antimicrobial compositions can affect two kinds of microbial cell damage. The first is a lethal, irreversible action resulting in complete microbial cell destruction or incapacitation. The second type of cell damage is reversible, such that if the organism is rendered free of the agent, it can again multiply. The former is termed microbiocidal and the later, microbistatic. A sanitizer and a disinfectant are, by definition, agents which provide antimicrobial or microbiocidal activity. In contrast, a preservative is generally described as an inhibitor or microbistatic composition As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "viscosity" is used herein to describe a property of the sprayable aqueous compositions for cleaning, sanitizing and disinfecting according to the invention. As one skilled in the art understands, both dynamic (shear) viscosity and bulk viscosity can be used to describe characteristics of the compositions. The shear viscosity of a liquid describes its resistance to shearing flows. The bulk viscosity of a liquid describes its ability to exhibit a form of internal friction that resists its flow without shear. The measurements of viscosity described herein use the physical until of poise (P) or centipoise (cPs).

The terms "water soluble" and "water miscible" as used herein, means that the component (e.g., liquid or solvent) is soluble or dispersible in water at about 20° C. at a concentration greater than about 0.2 g/L, preferably at about 1 g/L or greater, more preferably at 10 g/L or greater, and most preferably at about 50 g/L or greater.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions of the present invention may comprise, consist essentially of, or consist of the components and ingredients of the present invention as well as other ingredients described herein. As used herein, “consisting essentially of” means that the methods and compositions may include additional steps, components or ingredients, but only if the additional steps, components or ingredients do not materially alter the basic and novel characteristics of the claimed methods and compositions.

Reduced Misting Sprayable Compositions

The sprayable cleaning compositions according to the invention are suitable for packaging in pressurized aerosol spray units using commonly available pressure containers, aerosol valves and aerosol propellants. The sprayable cleaning compositions according to the invention can further be used in a pump spray format using a pump spray head and a suitable container. The various formulations of the sprayable cleaning compositions are typically applied to hard surfaces containing difficult inorganic, organic, or matrix-blended soils. Such soils include baked-on or carbonized food residues. Other surfaces can contain soils derived from substantially insoluble hardness components of service water. The sprayable cleaning compositions of the invention rapidly remove such soils due to the unique combination of the ingredients that can rapidly remove the soils but resist formation of an amount of mist or aerosol during application that can cause respiratory distress.

The present invention relates to reduced-misting sprayable cleaning compositions comprising, consisting of or consisting essentially of at least an alkali soluble emulsion polymer, a foaming agent, an alkalinity source, a thickenting agent, water, and additional functional ingredients. In some embodiments, the sprayable compositions may be dispensed with a trigger sprayer, such as non-low velocity or a low velocity trigger sprayer. The sprayable compositions may be dispensed in alternative manners as well. The reduced-misting sprayable cleaning compositions provide ease in manufacturing as a result of the rapid dispersion of the alkali soluble emulsion polymer into homogenous solutions. The reduced-misting sprayable cleaning compositions provide further benefits in addition to the ease in manufacturing, including for example, ease in application when using spray applications due to the reduced viscosity profiles allowing ease of use with spray triggers.

The sprayable cleaning composition may be referred to as a non-Newtonian fluid. Newtonian fluids have a short relaxation time and have a direct correlation between shear and elongational viscosity (the elongational viscosity of the fluid equals three times the shear viscosity). Shear viscosity is a measure of a fluid’s ability to resist the movement of layers relative to each other. Elongational viscosity, which is also known as extensional viscosity, is a measure of a fluid’s ability to stretch elastically under elongational stress. Non-Newtonian fluids do not have a direct correlation between shear and elongational viscosity and are able to store elastic energy when under strain, giving exponentially more elongational than shear viscosity and producing an effect of thickening under strain (i.e., shear thickening). These properties of non-Newtonian fluids result in the sprayable composition that has a low viscosity when not under shear but that thickens when under stress from the trigger sprayer forming larger droplets.

In an aspect and without being limited to a particular mechanism of action according to the invention the sprayable cleaning compositions provide non-Newtonian fluids resulting in a sprayable composition that has a low viscosity when not under shear and that thickens when under stress from a sprayer, such as a trigger sprayer forming larger droplets.

In some embodiments the sprayable cleaning composition has a relatively low shear viscosity when not under strain. In an embodiment, the shear viscosity of the sprayable cleaning composition containing the alkali soluble emulsion polymer(s) is comparable to the shear viscosity of water and may be referred to as a “thin liquid”. In a preferred embodiment, the sprayable cleaning compoistions have a viscosity of between about 1 cPs and about 500 cPs, more preferably betwewen about 1 cPs and about 250 cPs, most preferably between about 1 cPs and about 50 cPs.

In one example, the anti-mist components, namely alkali soluble emulsion polymers, do not increase the shear viscosity of the sprayable composition when not under strain and the increased shear viscosity is created by other components, such as a surfactant. In an aspect, the alkali soluble emulsion polymers do not increase the shear viscosity of the sprayable composition more than about 10%, more than about 9%, more than about 8%, more than about 7%, more than about 6%, more than about 5%, more than about 4%, more than about 3%, more than about 2%, or more than about 1%. In comparison, to achieve the same anti-misting efficacy with conventional thickening agents a much greater concentration is required and would cause significant increase in viscoelasticity of the compositions, and in most instances would not permit a spraying composition as achieved according to the present invention. As a skilled artisan will appreciate, the additional components of a sprayable composition can significantly increase the shear viscosity, such as the alkalinity source, surfactants and the like.

The present invention provides an unexpected benefit in the viscosity of the anti-mist compositions as a result of the flexible viscoelastic compositions afforded by the alkali soluble emulsion polymers. These benefits provide a stark constrast to the use of acrylamide and acrylamide-derived polymers currently employed to provide viscoelasticity for compositions; for example, the acrylamide-based compositions suffer running, whereas the present compositions have reduced running in addition to the reduced misting.

In some embodiments the median particle size of the dispensed solution of the reduced-misting sprayable cleaning compositions is sufficiently large to reduce misting. As one skilled in the art appreciates, particles having droplet size of less than about 10 microns can be readily inhaled. Moreover, particles having droplet size of less than about 0.1 microns can be readily inhaled into the lungs. Therefore, in many aspects of the invention the testing and evaluation of the sprayable compositions according to the invention focus on the reduction of misting, in particular reduction or elimination of micron sizes of about 10 or less. In an aspect of the invention, a suitable median particle size is about 11 microns or greater, 50 microns or greater, 70 microns or greater, about 10 microns or greater, about 150 microns or greater, or about 200 microns or greater. The suitable median particle size may depend on the composition of the RTU. For example, a suitable median particle size for a strongly alkaline or acidic use solution may be about 100 microns or greater, and more particularly about 150 microns or greater, and more particularly about 200 microns or greater. A suitable median particle size for a moderately alkaline or acidic RTU may be about 11 microns or greater, preferably about 50 microns or greater, and more preferably about 150 microns or greater.

The sprayable cleaning compositions preferably have a pH between about 8 and about 14, more preferably between about 9 and about 14, most preferably between about 12 and about 14.

The sprayable cleaning compositions according to the invention beneficially provide stable compositions wherein the alkali soluble emulsion polymer retains stability for at least about one year at ambient temperature, or at least about two years at ambient temperature. The stability is measured by the maintained anti-misting properties of the sprayable cleaning compositions.

Embodiments

Exemplary ranges of the sprayable cleaning compositions on are shown in Table 1 in weight percentage and are inclusive of some optional ingredients.

TABLE 1

| Material | First Exemplary Range wt-% | Second Exemplary Range wt-% | Third Exemplary Range wt-% |
|---|---|---|---|
| Alkali soluble emulsion polymer | 0.0035-1 | 0.005-0.5 | 0.05-0.2 |
| Alkalinity Source | 0.1-15 | 0.5-10 | 1-7 |
| Corrosion Inhibitor | 0-5 | 0.1-3 | 0.25-2.5 |
| Foaming Agent | 0.1-10 | 0.1-5 | 0.5-2.5 |
| Solvent | 0-10 | 0.1-7 | 0.5-4 |
| Thickening Agent | 0-10 | 0.1-10 | 0.5-7 |
| Water | 50-99 | 55-98 | 60-98 |
| Additional Functional Ingredients | 0-15 | 0.001-10 | 0.001-5 |

Alkali Soluble Emulsion Polymer

The reduced-misting sprayable cleaning compositions comprise an alkali soluble emulsion polymer. Preferably, the alkali soluble emulsion polymer is a water-soluble modified polymer. Alkali soluble emulsion polymers are synthesized from acid and acrylate co-monomers and are made through emulsion polymerization. They exemplify a formula as shown below:

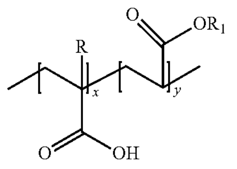

where x is between about 1 and about 10,000 and y is between about 1 and about 10,000; and wherein R comprises a hydrogen or alkyl group; and wherein $R_1$ comprises a hydrogen or alkyl group. Preferably, the alkali soluble emulsion polymer is stable at a pH of at least about 10, more preferably at least about 12, most preferably at least about 13. Preferred alkali soluble emulsion polymers are sold under the tradenames ACUSOL™ 810A, ACUSOL™ 835, and ACUSOL™ 842 by Rohm and Haas.

The alkali soluble emulsion polymers are a water-based emulsion, where the oil phase (dispersed phase) is dispersed within water (continuous phase); the alkali soluble emulsion polymers are not in an inverse emulsion. The alkali soluble emulsion polymers thicken via a non-associative mechanism. Non-associative rheology modifiers do not interact with surfactant structures, particulates, or insoluble emulsion droplets. Non-associative polymers thicken by structuring the continuous phase and through chain entanglement. This can stabilize pre-dispersed insolubles by significantly slowing their motion.

Preferably, the alkali soluble emulsion polymer has an equivalent weight of from about 50 to about 300, more preferably from about 75 to about 275, and most preferably from about 100 to about 250; where the equivalent weight is the measure in grams of the dry polymer neutralized by 1 equivalent (40 grams) of NaOH.

Preferably, the alkali soluble emulsion polymer is a free-flowing liquid. In an aspect, the alkali soluble emulsion polymer preferably has a viscosity of greater than 10 cps and less than about 150 cps, more preferably greater than 10 cps and less than about 100 cps, most preferably greater than 10 cps and less than about 25 cps.

An effective amount of the alkali soluble emulsion polymer is provided to the cleaning compositions to provide ready-to-use reduced misting compositions having lower concentrations that conventional viscosity-modifying polymers. Beneficially, the alkali soluble emulsion polymers are highly concentrated for dilution systems while maintaining viscoelasticity even for such highly concentrated formulations. In a preferred embodiment of the sprayable cleaning compositions, the alkali soluble emulsion polymer is preferably in a concentration of between about 0.0035 wt. % and about 1 wt. %, more preferably between about 0.005 wt. % and about 0.5 wt. %, and most preferably between about 0.05 wt. % and about 0.2 wt. %.

Alkalinity Source

The sprayable cleaning compositions comprise an alkalinity source. The alkalinity source are useful because the alkali soluble polymer is soluble in an alkaline environment, which causes the polymer to swell due to neutralization. This provides a more highly viscous composition, which we found improves the sprayability and reduced misting. The amount of alkalinity is preferably the amount needed to neutralize the alkali soluble polymer.

Suitable alkalinity sources include, but are not limited to, inorganic alkalinity sources, including alkali or alkaline earth metal borates, silicates, carbonates, hydroxides, phosphates and mixtures thereof. It is to be appreciated that phosphate includes all the broad class of phosphate materials, such as phosphates, pyrophosphates, polyphosphates (such as tripolyphosphate) and the like. Silicates include all of the usual silicates used in cleaning such as metasilicates, silicates and the like. The alkali or alkaline earth metals include such components as sodium, potassium, calcium, magnesium, barium and the like. It is to be appreciated that a cleaner composition can be improved by utilizing various mixtures of alkalinity sources.

In a preferred aspect, the alkalinity source is an inorganic alkali metal base. In a further preferred aspect, the alkalinity source is an alkali metal hydroxide. The sprayable cleaning composition may include, for example, sodium hydroxide. The inorganic alkali content of the spray-on cleaners of the invention is preferably derived from sodium or potassium hydroxide which can be used in both liquid (about 10-60 wt. % aqueous solution) or in solid (powder, flake or pellet) form. Preferably the preferred form of the alkali metal base is commercially available sodium hydroxide which can be obtained in aqueous solution at concentrations of about 50 wt. % and in a variety of solid forms of varying particle size and shapes.

Suitable alkalinity sources include, but are not limited to, organic alkalinity sources, including nitrogen bases. Organic sources of alkalinity are often strong nitrogen bases including, for example, ammonia, monoethanol amine, monopropanol amine, diethanol amine, dipropanol amine, triethanol amine, tripropanol amine, etc. One value of using the monoalkanol amine compounds relates to the solvent nature of the liquid amines. The use of some substantial proportion of a monoethanol amine, monopropanol amine, etc. can provide substantial alkalinity but can also provide substantial solvent power in combination with the other materials in the invention. In a preferred aspect, the alkalinity source is an organic monoethanol amine.

In a further preferred aspect, the alkalinity source is a combination of inorganic and organic alkalinity. The sprayable cleaning composition may include, for example, a combination of inorganic alkali such as sodium hydroxide and organic nitrogen bases such as ethanolamines.

Suitable concentrations of the alkalinity source, can depend on the alkalinity source employed and its active concentration, such that it is in a concentration sufficient to neutralize the alkali soluble emulsion polymer. In a preferred embodiment, the amount of alkalinity source in the sprayable cleaning composition is preferably between about 0.1 wt. % and about 15 wt. %, more preferably between about 0.5 wt. % and about 10 wt. %, and most preferably between about 1 wt. % and about 7 wt. %.

Corrosion Inhibitor

In a preferred embodiment, the sprayable cleaning compositions can optionally comprise a corrosion inhibitor. If included in the sprayable cleaning compositions, the corrosion inhibitor is preferably in a concentration between about 0.01 wt. % and about 5 wt. %, more preferably between about 0.1 wt. % and about 3 wt. %, and most preferably between about 0.25 wt. % and about 2.5 wt. %.

Preferred corrosion inhibitors include, but are not limited to, sodium gluconate, sodium glucoheptonate, and mixtures thereof.

Foaming Agent

The sprayable cleaning compositions preferably include a foaming agent. The foaming agent is preferably in the sprayable cleaning compositions, in a concentration between about 0.1 wt. % and about 10 wt. %, more preferably between about 0.1 wt. % and about 5 wt. %, and most preferably between about 0.5 wt. % and about 2.5 wt. %.

Suitable foaming agents can include a variety of surfactants that provide foaming properties, including, anionic, nonionic, amphoteric, and zwitterionic surfactants. We have found however, that cationic surfactants are incompatible with the alkali soluble emulsion polymer and therefore should not be included in the sprayable cleaning compositions.

Anionic Surfactants

Anionic sulfate surfactants suitable for use in the present compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule).

Anionic sulfonate surfactants suitable for use in the present compositions also include alkyl sulfonates, the linear and branched primary and secondary alkyl sulfonates, and the aromatic sulfonates with or without substituents.

Anionic carboxylate surfactants suitable for use in the present compositions include carboxylic acids (and salts), such as alkanoic acids (and alkanoates), ester carboxylic acids (e.g. alkyl succinates), ether carboxylic acids, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula:

$$R—O—(CH_2CH_2O)_n(CH_2)_m—CO_2X \quad (3)$$

in which R is a $C_8$ to $C_{22}$ alkyl group or

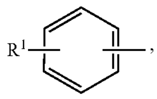, in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_8$-$C_{16}$ alkyl group. In some embodiments, R is a $C_{12}$-$C_{14}$ alkyl group, n is 4, and m is 1.

In other embodiments, R is

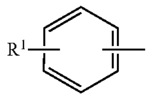

and $R^1$ is a $C_6$-$C_{12}$ alkyl group. In still yet other embodiments, $R^1$ is a $C_9$ alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include, Neodox 23-4, a $C_{12-13}$ alkyl polyethoxy (4) carboxylic acid (Shell Chemical), and Emcol CNP-110, a $C_9$ alkylaryl polyethoxy (10) carboxylic acid (Witco Chemical). Carboxylates are also available from Clariant, e.g. the product Sandopan® DTC, a $C_{13}$ alkyl polyethoxy (7) carboxylic acid.

Nonionic Surfactants

Nonionic surfactants carry no discrete charge when dissolved in aqueous media. Hydrophilicity of the nonionic is provided by hydrogen bonding with water molecules. Preferred nonionic surfactants include alkoxylated surfactants, EO/PO copolymers, capped EO/PO copolymers, alcohol alkoxylates, capped alcohol alkoxylates, mixtures thereof, or the like. Further suitable nonionic surfactants include amine oxides, phosphine oxides, sulfoxides and their alkoxylated derivatives. Particularly suitable amine oxides include tertiary amine oxide surfactants which typically comprise three alkyl groups attached to an amine oxide (N→O). Commonly the alkyl groups comprise two lower (C1-4) alkyl groups combined with one higher C6-24 alkyl groups, or can comprise two higher alkyl groups combined with one lower alkyl group. Further, the lower alkyl groups can comprise alkyl groups substituted with hydrophilic moiety such as hydroxyl, amine groups, carboxylic groups, etc.

Amine oxides (tertiary amine oxides) have the corresponding general formula:

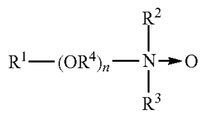

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkylene or a hydroxyalkylene group containing 2 to 3 carbon atoms; and n ranges from 0 to about 20. An amine oxide can be generated from the corresponding amine and an oxidizing agent, such as hydrogen peroxide. The classification of amine oxide materials may depend on the pH of the solution. On the acid side, amine oxide materials protonate and can simulate cationic surfactant characteristics. At neutral pH, amine oxide materials are non-ionic surfactants and on the alkaline side, they exhibit anionic characteristics.

Useful water soluble amine oxide surfactants are selected from the octyl, decyl, dodecyl (lauryl), isododecyl, coconut, or tallow alkyl di-(lower alkyl) amine oxides, specific examples of which are octyldimethylamine oxide, nonyldimethylamine oxide, decyldimethylamine oxide, undecyldimethylamine oxide, dodecyldimethylamine oxide, iso-dodecyldimethyl amine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl) amine oxide, 3,6,9-trioctadecyldimethylamine oxide and 3-dodecoxy-2-hydroxypropyldi-(2-hydroxyethyl)amine oxide.

Amphoteric Surfactants

Suitable amphoteric surfactants contain both an acidic and a basic hydrophilic moiety in the structure and may be any of the anionic or cationic groups that have just been described previously in the sections relating to anionic or cationic surfactants. Anionic groups include carboxylate, sulfate, sulfonate, phosphonate, etc. while the cationic groups typically comprise compounds having amine nitrogens. Many amphoteric surfactants also contain ether oxides or hydroxyl groups that strengthen their hydrophilic tendency. Preferred amphoteric surfactants of this invention comprise surfactants that have a cationic amino group combined with an anionic carboxylate or sulfonate group. Examples of useful amphoteric surfactants include the sulfobetaines, N-coco-3,3-aminopropionic acid and its sodium salt, n-tallow-3-amino-dipropionate disodium salt, 1,1-bis (carboxymethyl)-2-undecyl-2-imidazolinium hydroxide disodium salt, cocoaminobutyric acid, cocoaminopropionic acid, cocoamidocarboxy glycinate, cocobetaine. Suitable amphoteric surfactants include cocoamidopropylbetaine and cocoaminoethylbetaine.

Solvent

In a preferred embodiment, the sprayable cleaning compositions can optionally comprise a solvent. If included in the sprayable cleaning compositions, the solvent is preferably in a concentration between about 0.01 wt. % and about 10 wt. %, more preferably between about 0.1 wt. % and about 7 wt. %, and most preferably between about 0.5 wt. % and about 4 wt. %.

Preferred solvents include, but are not limited to, lower alkanol amines, lower alkanols, lower alkyl ethers, lower alkyl glycol ethers, and mixtures thereof. These materials are colorless liquids with mild pleasant odors, are excellent solvents and coupling agents and are typically miscible with cleaning compositions of the invention. Examples of such useful solvents include lower alkanol amines, methanol, ethanol, propanol, isopropanol and butanol, isobutanol, benzyl alcohol, ethylene glycol, diethylene glycol, triethylene glycol, propylene glycol, dipropylene glycol, mixed ethylene-propylene glycol ethers. The glycol ethers include lower alkyl ($C_{1-8}$ alkyl) ethers including propylene glycolmethyl ether, propylene glycol ethyl ether, propylene glycol phenyl ether, propylene glycol propyl ether, dipropylene glycol methyl ether, dipropylene glycol phenyl ether, dipropylene glycol ethyl ether, tripropylene glycol methyl ether, ethylene glycol methyl ether, ethylene glycol ethyl ether, ethylene glycol butyl ether, diethylene glycol methyl ether diethylene glycol phenyl ether, diethylene glycol butyl ether, ethylene glycol dimethyl ether, ethylene glycol monobutyl ether, ethylene glycol phenyl ether and others. Preferred lower alkanol amines, include, but are not limited to, monoethanol amine, monopropanol amine, diethanol amine, dipropanol amine, triethanol amine, tripropanol amine, and mixtures thereof.

Thickening Agent

In a preferred embodiment, the sprayable cleaning compositions can optionally comprise a thickening agent. If included in the sprayable cleaning compositions, the thickening agent is preferably in a small concentration so as to avoid some of the processing and manufacturing difficulties that can arise from use of certain thickening agents. If included, the thickening agent is preferably between about 0.01 wt. % and about 10 wt. %, more preferably between about 0.1 wt. % and about 7 wt. %, and most preferably between about 0.5 wt. % and about 5 wt. %.

Preferred thickening agents include, but are not limited to, small amounts of xanthan gum and/or other additional polymers as thickening or viscosity agents. A variety of well-known organic thickener materials are known in the art. In alternative embodiments according to the invention wherein a small concentration of a thickener is employed in combination with the alkali soluble emulsion polymer, natural polymers or gums derived from plant or animal sources are preferred. Such materials are often large polysaccharide molecules having substantial thickening capacity.

A substantially soluble organic thickener can be used to provide thixotropic to the compositions of the invention. The preferred thickeners have some substantial proportion of water solubility to promote easy removability. Examples of soluble organic thickeners include for example, carboxylated vinyl polymers such as polyacrylic acids and sodium salts thereof, boric acid, diethanolamide, coco-diethanolamide, coco-monoethanolamide, stearic-diethanolamide, ethoxylated cellulose, hydroxyethyl styrylamide, oleic-diethanolamide, stearic-monoethanolamide, cetyl alcohol, steroyl alcohol, polyacrylamide thickeners, ethanol glycol disterate, xanthan compositions, sodium alginate and algin products, hydroxypropyl cellulose, hydroxyethyl cellulose, and other similar aqueous thickeners that have some substantial proportion of water solubility.

Exemplary thickeners include xanthan gum derivatives. Xanthan is an extracellular polysaccharide of xanthomonas campestras. Xanthan is made by fermentation based on corn sugar or other corn sweetener by-products. Xanthan comprises a poly beta-(1→4)-D-Glucopyranosyl backbone chain, similar to that found in cellulose. Aqueous dispersions of xanthan gum and its derivatives exhibit novel and remarkable rheological properties. Low concentrations of the gum have relatively high viscosity which permits it economical use and application. Xanthan gum solutions exhibit high pseudoplasticity, i.e. over a wide range of concentrations, rapid shear thinning occurs that is generally understood to be instantaneously reversible. Non-sheared materials have viscosity that appears to be independent of the pH and independent of temperature over wide ranges. Preferred xanthan materials include crosslinked xanthan materials. Xanthan polymers can be crosslinked with a variety of known covalent reacting crosslinking agents reactive with the hydroxyl functionality of large polysaccharide molecules and can also be crosslinked using divalent, trivalent or polyvalent metal ions. Such crosslinked xanthan gels are disclosed in U.S. Pat. No. 4,782,901, which is incorporated by reference herein. Suitable crosslinking agents for xanthan materials include metal cations such as $Al^{+3}$, $Fe^{+3}$, $Sb^{+3}$, $Zr^{+4}$ and other transition metals, etc. Known organic crosslinking agents can also be used.

Water

The sprayable cleaning composition further comprise water. Distilled, deionized, or reverse osmosis water is preferred, however, any water source can be employed. If the water source is hard, it is preferable to also including a chelating or sequestering agent. The water is preferably added in an amount between about 50 wt. % and about 99 wt. %, more preferably between about 55 wt. % and about 98 wt. %, and most preferably between about 60 wt. % and about 98 wt. % of the sprayable cleaning composition.

Additional Functional Ingredients

The components of the compositions can further be combined with various functional components. In some embodiments, the compositions including the alkali soluble emulsion polymer, alkalinity source, foaming agent, and water make up a large amount, or even substantially all of the total weight of the composition. For example, in some embodiments few or no additional functional ingredients are disposed therein. In other embodiments, the one or more of the optional ingredients described above may be in the sprayable cleaning compoistions, including, but not limited to, a corrosion inhibitor, a solvent, and/or a thickening agent.

In other embodiments, additional functional ingredients may be included in the compositions. The functional ingredients provide desired properties and functionalities to the compositions. For the purpose of this application, the term "functional ingredient" includes a material that when dispersed or dissolved in the aqueous use solution provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in hard surface cleaning. However, other embodiments may include functional ingredients for use in other applications.

In some embodiments, the compositions may include additional functional ingredients including, for example, solubility modifiers, stabilizing agents, sequestrants and/or chelating agents, fragrances and/or dyes, hydrotropes or couplers, buffers, adjuvant materials for hard surface cleaning and the like. Exemplary adjuvant materials for hard surface cleaning may include foam enhancing agents, foam suppressing agents (when desired), preservatives, antioxidants, pH adjusting agents, cosolvents and other useful well understood material adjuvants.

Sequestrants

The cleaning composition can contain an organic or inorganic sequestrant or mixtures of sequestrants. Organic sequestrants such as sodium citrate, the alkali metal salts of nitrilotriacetic acid (NTA), dicarboxymethyl glutamic acid tetrasodium salt (GLDA), EDTA, alkali metal gluconates, polyelectrolytes such as a polyacrylic acid, and the like can be used herein. The most preferred sequestrants are organic sequestrants such as sodium gluconate due to the compatibility of the sequestrant with the formulation base.

The present invention can also incorporate sequestrants to include materials such as, complex phosphate sequestrants, including sodium tripolyphosphate, sodium hexametaphosphate, and the like, as well as mixtures thereof. Phosphates, the sodium condensed phosphate hardness sequestering agent component functions as a water softener, a cleaner, and a detergent builder. Alkali metal (M) linear and cyclic condensed phosphates commonly have a $M_2O:P_2O_5$ mole ratio of about 1:1 to 2:1 and greater. Typical polyphosphates of this kind are the preferred sodium tripolyphosphate, sodium hexametaphosphate, sodium metaphosphate as well as corresponding potassium salts of these phosphates and mixtures thereof. The particle size of the phosphate is not critical, and any finely divided or granular commercially available product can be employed.

Dyes/Odorants

Various dyes, odorants including perfumes, and other aesthetic enhancing agents may also be included in the compositions. Examples of suitable commercially available dyes include, but are not limited to: Direct Blue 86, available from Mac Dye-Chem Industries, Ahmedabad, India; Fastusol Blue, available from Mobay Chemical Corporation, Pittsburgh, PA; Acid Orange 7, available from American Cyanamid Company, Wayne, NJ; Basic Violet 10 and Sandolan Blue/Acid Blue 182, available from Sandoz, Princeton, NJ; Acid Yellow 23, available from Chemos GmbH, Regenstauf, Germany; Acid Yellow 17, available from Sigma Chemical, St. Louis, MO; Sap Green and Metanil Yellow, available from Keystone Aniline and Chemical, Chicago, IL; Acid Blue 9, available from Emerald Hilton Davis, LLC, Cincinnati, OH; Hisol Fast Red and Fluorescein, available from Capitol Color and Chemical Company, Newark, NJ; and Acid Green 25, Ciba Specialty Chemicals Corporation, Greenboro, NC.

Examples of suitable fragrances or perfumes include, but are not limited to: terpenoids such as citronellol, aldehydes such as amyl cinnamaldehyde, a jasmine such as CIS-jasmine or jasmal, and vanillin.

Manufacturing Methods

The cleaning compositions according to the invention can be made by combining the components in an aqueous diluent using commonly available containers and blending apparatus. Beneficially, no special manufacturing equipment is required for making the cleaning compositions employing the alkali soluble emulsion polymers. A preferred method for manufacturing the cleaning composition of the invention includes introducing the components into a stirred production vessel. In an aspect, a quantity of the alkali soluble emulsion polymer, foaming agent, water, and then the alkaline components are combined. In an aspect, deionized water is employed. If a traditional thickener such as Xanthan Gum is included, then additional processing steps may be required depending on the concentration of the thickener added. This additional processing steps may include, processing through an inductor funnel or similar apparatus to ensure proper dispersion of the thickener and to minimize the formation of fish eyes.

Beneficially, the use of the alkali soluble emulsion polymers to generate the cleaning composition solutions does not require long, energy intensive dissolution (or inversion of the polymers into solution) as a result of not significantly increasing the viscosity of the cleaning composition or exceeding solubility limits of the composition. In an aspect, the alkali soluble emulsion polymers are readily blended into the cleaning compositions, resulting in clear, low viscosity solutions. In an aspect, the dissolution time is less than 10 minutes, or less than 5 minutes for a homogenous solution, and preferably less than 3 minutes for a homogenous solution as opposed to 30 minutes to a few hours for traditional thickeners such as Xanthan gum. If a traditional thickener such as Xanthan Gum is included, then additional processing time may be required depending on the concentration of the thickener added. This additional processing time is preferably less than about 1 hour, more preferably less than about 45 minutes, most preferably about 30 minutes or less.

As a result of the rapid dissolution or inversion of the polymers into solution, the highly concentrated cleaning compositions can be manufactured in large batch volumes within less than about an hour, in comparison to conventional reduced-misting compositions require from about 8 to 24 hours or greater. Moreover, the cleaning compositions can be produced using in-line mixing or on-site formulation, providing a significant manufacturing benefit not obtained by the conventional reduced-misting compositions. Such manufacturing benefits are particular important as various sprayable hard surface compositions in need of reduced missing formulations and having short term stability would benefit from the enhanced ease in manufacturing afforded by the methods of making the cleaning compositions of the present invention.

Methods of Use

The sprayable cleaning compositions can be used for removing stubborn soils from a variety of surfaces. For example, the sprayable composition can be used in institutional applications, food and beverage applications, heath care applications, vehicle care applications, pest elimination applications, and laundering applications Such applications include but are not limited to kitchen and bathroom cleaning and destaining, general purpose cleaning and destaining, surface cleaning and destaining (particularly hard surfaces), industrial or household cleaners, and antimicrobial cleaning applications. Additional applications may include, for example, laundry and textile cleaning and destaining, carpet cleaning and destaining, vehicle cleaning and destaining, cleaning in place operations, glass window cleaning, air freshening or fragrancing, industrial or household cleaners, and antimicrobial cleaning. Beneficially, the alkali soluble emulsion polymer-containing cleaning compositions provide a rapid diffusion rate of active cleaning agents to soils as a result of the thin liquid like viscosity of the cleaning compositions according to the invention.

The sprayable cleaning compositions can be used in any environment where it is desirable to reduce the amount of airborne particulates of the composition during spray applications. Without being limited according to the mechanism of the invention, in one embodiment, when the sprayable ready-to-use solution is dispensed, the solution exhibits an increased median droplet size and reduced mist or aerosol. In one embodiment, the sprayable use solution produces little or no small particle aerosol.

The sprayable cleaning compositions of the invention can be used in a pump spray format using a pump spray head and a suitable container. The materials are typically applied to hard surfaces containing difficult inorganic, organic, or matrix-blended soils. Such soils include baked-on or carbonized food residues. Other surfaces can contain soils derived from substantially insoluble hardness components of service water. The enhanced cleaning compositions of the invention rapidly remove such soils because the cleaners have a unique combination of alkali soluble emulsion polymers that can rapidly remove the soils but resist formation of an amount of mist or aerosol during application that can cause respiratory distress.

The current cleaning composition can be a ready-to-use cleaning composition which may be applied with a transient trigger sprayer. A ready-to-use composition does not require dilution prior to application to a surface. Example transient trigger sprayers include stock transient trigger sprayers (i.e., non-low velocity trigger sprayer) available from Calmar. Suitable commercially available stock transient trigger sprayers include Calmar Mixor HP 1.66 output trigger sprayer. The alkali soluble emulsion polymers of the cleaning composition results in an increased median particle size of the dispensed cleaning composition, which reduces inhalation of the use solution.

The cleaning compositions may also be dispensed using a low velocity trigger sprayer, such as those available from Calmar. A typical transient trigger sprayer includes a discharge valve at the nozzle end of the discharge end of a discharge passage. A resilient member, such as a spring, keeps the discharge valve seated in a closed position. When the fluid pressure in the discharge valve is greater than the force of the resilient member, the discharge valve opens and disperses the fluid. A typical discharge valve on a stock trigger sprayer is a throttling valve which allows the user to control the actuation rate of the trigger sprayer. The actuation rate of the discharge valve determines the flow velocity, and a greater velocity results in smaller droplets. A low velocity trigger sprayer can contain a two-stage pressure build-up discharge valve assembly which regulates the operator's pumping stroke velocity and produces a well-defined particle size. In one example, the two-stage pressure build-up discharge valve can include a first valve having a high pressure threshold and a second valve having a lower pressure threshold so that the discharge valve snaps open and closed at the beginning and end of the pumping process. Example low-velocity trigger sprayers are commercially available from Calmar and are described in U.S. Pat. Nos. 5,522,547 and 7,775,405, which are incorporated in their entirety herein. The low velocity trigger sprayers may result in less drifting, misting and atomization of the cleaning composition, and may reduce the amount of small droplets dispensed. The cleaning composition containing the surfactant system may work in synergy with the low velocity trigger sprayer to produce a greater increase in droplet size than expect based on the components alone.

When sprayed, the cleaning compositions employing the alkali soluble emulsion polymers result in reduced misting and atomization. Reduction in drift, misting, and atomization can be determined from the droplet size of the applied solution, with an increased droplet size indicating reduced misting and atomization. Reduced inhalation can also be measured indirectly by reduced aerosol mass collection from high volume air sampling. The increased droplet size also reduces inhalation of the use solution. Preferably, the median droplet size is about 10 microns or greater, about 50 microns or greater, about 70 microns or greater, about 100 microns or greater, about 150 microns or greater and preferably about 200 microns or greater. There are several methods for determining droplet size including, but not limited to, adaptive high speed cameras, laser diffraction, and phase Doppler particle analysis. Commercially available laser diffraction apparatuses include Spraytec available from Malvern and Helos available from Sympatec.

When sprayed, the cleaning compositions employing the alkali soluble emulsion polymers further result in providing a liquid solution having sufficiently large droplets on the target surface to beneficially cling to a vertical surface for a period of time. Cleaning compositions applied to vertical surfaces typically run down the surface because of gravity. The solutions of the cleaning compositions are beneficially able to cling to vertical surfaces for an increased period of time. That is, after an elapsed period of time, a greater amount of the current cleaning composition still remains on a vertical surface compared to compositions not including the surfactant system. This increased cling time leads to exposing the surface to the cleaning composition for a longer period of time and potentially better cleaning. The cleaning composition can be easily removed by wiping.

The cleaning compositions may also be dispensed using a pressurized aerosol or aerosol pump spray. In pressurized aerosol application, the compositions of the invention are combined with an aerosol propellant and packaged in a metal high pressure container. Typical propellants include lower alkanes such as propane, butane, nitrous oxide, carbon dioxide, and a variety of fluorocarbons. Pressurized aerosol containers typically include a spray head, valve and dip tube that reaches to the opposite end of the container to ensure that the entire contents of the container is dispensed through the action of the propellant. When the valve is opened (depressed), the propellant pressure forces liquid into the dip tube and through the aerosol spray head. At the spray head exit, a spray pattern is created by the geometry of the aerosol valve which directs the material onto the soiled surface. Aerosol containers, dip tubes, propellants and spray valves are a well understood commercial technology. Pump spray devices commonly comprise a container spray head valve pump and dip tube. Actuating the pump causes a piston to travel in a cylinder filled with compositions of the invention. The piston motion forces the composition through an aerosol valve causing the spray to adhere to a soiled surface. Once the piston reaches its full travel path, the piston is returned by a spring action to its original position causing the cylinder to fill with additional quantities of the spray material through a valve opening. As the piston is again pressed through the cylinder the valve closes preventing the exit of any of the solution from the cylinder. The pump spray can deliver substantial quantities of the material onto the soiled surface.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the preferred embodiments of the inventions described herein are exemplified in the following non-limiting Examples. It should be understood that these Examples, while indicating certain embodiments of the invention, are given by way of illustration only and are non-limiting. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

Spray Test. A spray pattern test was designed to visually grade the suitability of the alkali soluble emulsion polymers for formulation of reduced misting alkaline cleaning compositions for spray applications in comparison to a control (heavy duty degreaser without alkali soluble emulsion polymers). The various formulations are shown below in Table 2.

TABLE 2

| Ingredient | Control % Wt (Active) | Formulation A % Wt (Active) |
|---|---|---|
| Water | 91.85 | 91.97 |
| Xanthan Gum polysaccharide | 0.2 | 0.2 |
| Alkalinity Source | 4.5 | 4.5 |
| Amphoteric surfactant | 0.6 | 0.6 |
| Nonionic surfactant | 0.15 | 0.15 |
| Sodium Gluconate | 1.6 | 1.6 |
| Monoethanolamine | 0.9 | 0.9 |
| Alkali Soluble Emulsion Polymer | | 0.075 |
| Dye | 0.0003 | 0.0003 |

Each sample was sprayed using the same spray head-transient trigger sprayer available from Calmar (Calmar Mixor HP 1.66 output trigger sprayer). All spayers were made from a distance of 14" from the paper target. The spray was initiated at a parallel to horizontal orientation compared to bench surface, two to three spray trigger pulls were completed with an image capture for observation obtained 5 seconds following the spray. The results of the spray pattern test are shown in FIG. 1. The observations for each cleaning composition was observed as follows:

The control sample resulted in a very fine spray and high misting with very small droplets, wherein the droplet spray spread across the entire sheet. The very fine mist/spray had a wide spray pattern and there was noticeable respiratory irritation as a result of inhalation.

Formulation A resulted in a uniform spray with large droplet size, wherein most of the spray was localized in the center. The formulation resulted in the lowest number of small spray droplets across the entire sheet. Therefore, in comparing Formulation A and the Control, the addition of the alkali soluble emulsion polymer helped to reduce misting or the amount of airborne particulates of the composition during spray applications, thereby reducing respiratory inhalation of the cleaning composition.

Example 2

TSI OPS particle size test. Particle size analysis of cleaning composition solutions containing alkali soluble emulsion polymers were conducted against a control composition. The micron size of particles to confirm reduced inhalation was conducted using TSI particle analysis.

A Control formulation was evaluated against a composition containing alkali soluble emulsion polymers according to the invention on the TSI OPS (optical particle sizer) particle size analyzer to determine mass and number counts of spray mist for each formula sample after being sprayed into a shower stall. A TSI OPS device with Aerosol Instrument Manager (AIM) Software was employed for the following test methodology.

The OPS is connected to a power source and computer. The cap of OPS is removed to allow air to pass through the inlet at a rate of 1 L/min and is positioned within the "breathing zone" of the shower stall. As referred to herein, the breathing zone refers to the area wherein mist comes back towards a user who sprays a cleaning formulation for a particular cleaning application, after making contact with a surface in need of cleaning. To simulate the breathing zone, a bucket was placed on a cart and positioned to elevate the OPS to an appropriate height to mimic the height of administration of an average adult administering a cleaning composition into a shower stall. The testing for this Example established the "breathing zone" for the exemplary test as approximately 55 inches in height and 37.5 inches from the shower wall to the location of OPS device. Additional dimensions of the shower stall included 54 inches from the floor to spray nozzle, 55 inches from the floor to air inlet, 80 inches from the floor to the top of curtains, and 58 inches wide (shower stall). The shower stall walls are thoroughly wet down with water. An initial measurement is obtained and recorded for the air before testing any samples.

A Calmar Mixor HP trigger sprayer was employed for each sample formulation, which was sprayed before each testing to ensure it was primed. The shower stall walls are again thoroughly wet down with water before application of the sample formulation. The OPS is powered to begin data collection while the sample formulation is sprayed into the shower stall. Each sample formulation is sprayed 40 times around the shower stall and the OPS collects the data for the sample formulation. During the testing drafts of air are avoided as they may disrupt sample collection by dispersing particles away from the test area. For each sample formulation, five data collections are obtained, and the highest particle count is used as the data point for the sample formulation.

After each tested sample formulation, the shower stall is aired out, such as by using a fan or opening doors to the area to air out particles that were previously sprayed with the sample formulation. The remaining sample formulations are tested using the same procedure.

Various formulations were employed to evaluate the stability of various cleaning composition solutions containing alkali soluble emulsion polymers in an alkaline composition to ensure the alkali soluble emulsion polymers are not degraded during storage and/or shipment.

Figure 2:
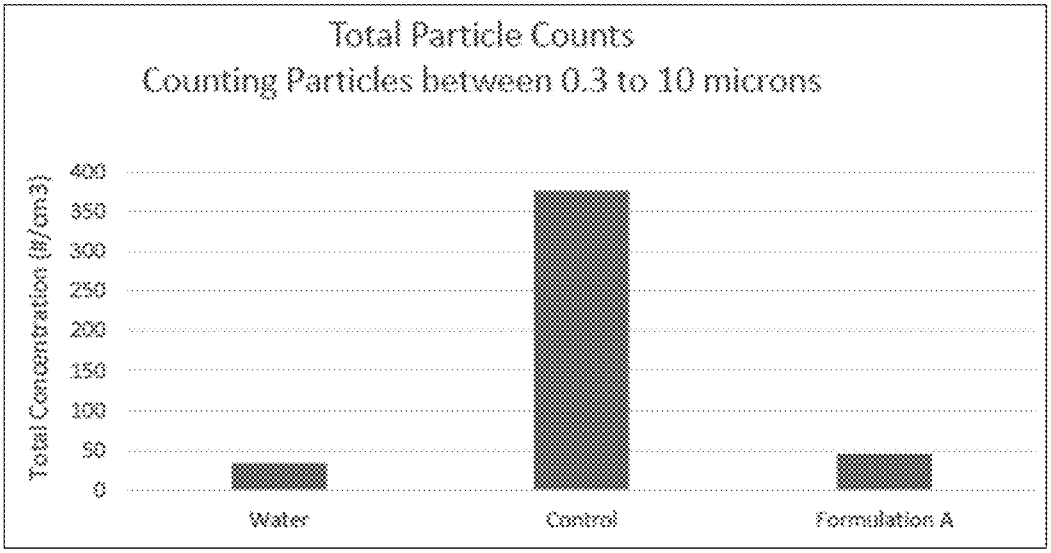
FIG. 2 shows the total particle count concentration of particles between 0.3 to 10 microns for a control cleaning composition in comparison to an exemplary cleaning composition of the present application containing alkali soluble emulsion polymers.
Figure 3:
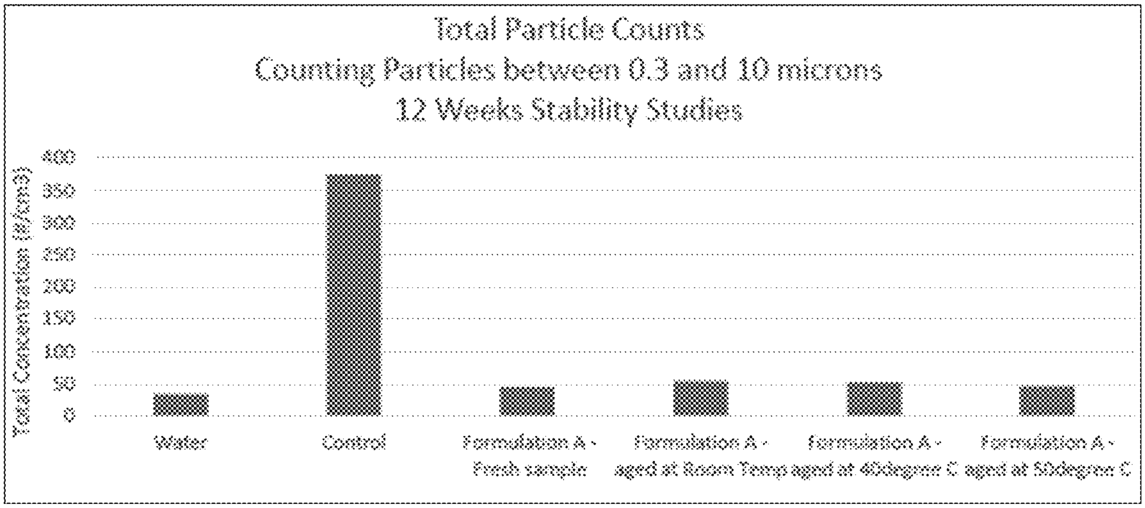
FIG. 3 shows the total particle count concentration of particles between 0.3 to 10 microns after a period of 12 weeks for a control cleaning composition in comparison to exemplary cleaning compositions of the present application containing alkali soluble emulsion polymers at various temperatures.

Samples of each test formulation including the Control and Formulation A were generated as shown in Table 2 above from Example 1. The results are shown in FIG. 2, providing a measurement of the total number of particles—0.3 to 10 micron misting particle analysis—within the breathing zone, providing a total concentration of mist of the undesirable micron size, generated according to the Example with the tested formulations. Formulation A was further aged at various temperatures to measure the total particle count and stability of the composition after a period of 12 weeks at various temperatures (room temperature, 40° C., and 50° C.) as shown in FIG. 3.

The figures demonstrate that the addition of alkali soluble emulsion polymers reduces the number of undesirable small particle size particles compared to a control composition that does not include alkali soluble emulsion polymers. Further FIG. 3 demonstrates that compositions including alkali soluble emulsion polymers remained stable with low particle size over 12 weeks of storage at various temperatures. Beneficially, the data demonstrates the alkali soluble emulsion polymers are very effective rheology modifiers as they greatly reduce the misting or bounced back particles of the 0.3 to 10 micron range. Further, as shown in FIG. 3, the formulation of the present application exhibited superior stability after 12 weeks at elevated temperatures.

Example 3

Gardner Abrasion Test. The amount of soil removal/cleaning efficacy was evaluated for the compositions of the present application in comparison to a control formulation. The compositions tested included the Control formulation from Example 2, as well as the Control formulation+750 ppm of alkali soluble emulsion polymer, and the Control formulation+1000 ppm alkali soluble emulsion polymer.

Red and black soil tests were conducted to evaluate the amount of soil removal achieved by the cleaning compositions containing the alkali soluble emulsion polymers. The black oily soil (hereinafter "black soil") contains carbon-based components to mimic soils typically found on floors and hard surfaces in a variety of environments. The red soil (hereinafter "red soil") contains food fats and proteins to mimic food soils generally found in food preparation and eating areas. Cleaning efficiency is determined by calculating a change in reflectance from colorimeter readings.

The red soil was prepared from lard, oil, protein, and iron (III) oxide (for color). About 30 grams of lard was combined with about 30 grams of corn oil, about 15 grams of whole powdered egg, and about 1.5 grams of $Fe_2O_3$.

The black soil was prepared with about 50 grams mineral spirits, about 5 grams mineral oil, about 5 grams motor oil, about 2.5 grams black pigment dispersion and about 37.5 grams Black Charm Ball Clay was prepared.

Tiles soiled with red soil were prepared and tiles soiled with black soil were also prepared. The back, grooved sides of a plurality of 3"×3" white vinyl tiles were soiled with approximately 0.75 grams of the soils using a 3" foam brush. The tiles were allowed to dry at room temperature overnight. For the red soil, it is believed that this incubation period allowed the bonds holding the triglycerides and proteins together in the soil to begin to crystallize and interlink. The next day, the tiles were placed into a soaking tray containing about 200 grams of a test composition for about 1 minute for red soil and about 2 minutes for black soil.

The soil removal test was conducted using Gardco Washability Test Equipment Model D10V available from Paul N. Gardner Company Inc., using a synthetic sponge. The dry synthetic sponge was saturated with about 80 grams of the test compositions. The tiles were then placed into the Gardco with the grain of the tiles parallel to the direction of sponge travel. The tiles were scrubbed with about 2 pounds of pressure with the moistened synthetic sponge for 16 cycles, rotating the tiles 90 degrees every 4 cycles for a complete 360 degree rotation of the tiles for red soil and 40 cycles, rotating the tiles 90 degrees every 10 cycles for a complete 360 degree rotation of the tiles for black soil. The tiles were then rinsed with city water and dried overnight at room temperature. The percent reflectance change of soil removal was calculated according to the equation below:

$$\%\ \text{Soil Removal} = \frac{(\text{Scrubbed Soil Reading} - \text{Soil Reading})}{(\text{Initial Tile Reading} - \text{Soil Reading})} \times 100$$

Figure 4:
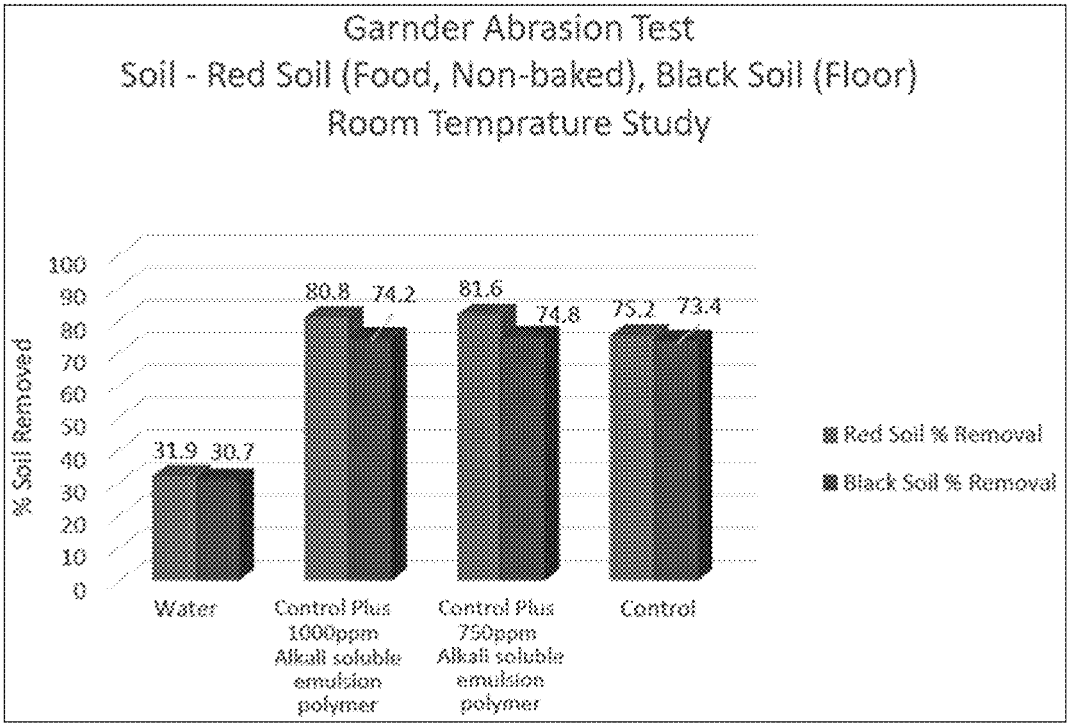
FIG. 4 shows the percent soil removal of Red Soils and Black Soils at room temperature using a control cleaning composition in comparison to exemplary cleaning compositions of the present application containing alkali soluble emulsion polymers at various concentrations.

The results of the red and black soil test at room temperature are shown in FIG. 4. As shown in FIG. 4, the compositions of the present application demonstrated equivalent or superior cleaning efficacy on both red and black soils compared to the Control formulation, which did not include any alkali soluble emulsion polymers. The results demonstrate that the inclusion of the alkali soluble emulsion polymer does not interfere with the soil removal, and the chemistry is still able to move to the surface and act effectively.

Example 4

Corn Oil Removal Test Method. Rate of soil removal/cleaning efficacy was evaluated using a polymerized grease soil test, in particular, a corn oil removal test method. This testing was performed to demonstrate the increased speed of action on soils achieved by the compositions containing alkaline components. The speed of cleaning is a demonstration of the ability of the cleaning composition to penetrate the polymerized soil via relative soil removal over a set time.

Procedure

Panel Preparation

1. Prepared 304 stainless steel 3"×5" panels for testing using the following procedure.
2. Coated with Corn oil (0.12 g) with clean polyurethane foam sponge.
3. Preheated oven to 362° F. for at least 30 minutes.
4. Placed soiled panels on an aluminum pan on the center rack of the pre-heated oven as level as possible for 25 mins while rotating panels once at 10 minutes, 15 minutes, 20 minutes and taken out after 25 minutes.
5. Pull out the polymerized soil plates and allow cool to room temperature.
6. Place panels with polymerized soil on flat surface and add 6-7 drops of the test formula and record the time it takes to completely remove the polymerized soil.

The test composition evaluated included the Control formulation from Example 2, as well as the Control formulation+750 ppm of alkali soluble emulsion polymer, and the Control formulation+1000 ppm alkali soluble emulsion polymer. The results of the corn oil removal test method after 60 seconds are shown in FIG. 5.

Figure 5:
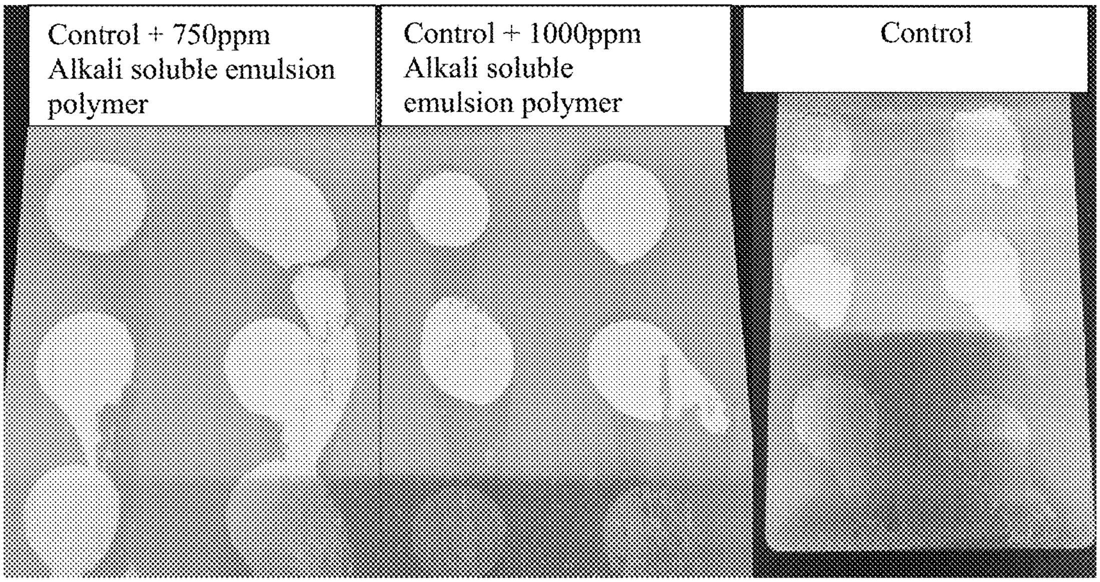
FIG. 5 shows the cleaning efficacy of polymerized corn oil after 60 seconds using a control cleaning composition in comparison to exemplary cleaning compositions of the present application containing alkali soluble emulsion polymers at various concentrations.

As shown in FIG. 5, both the control and control+alkali soluble emulsion polymer compositions are able to penetrate and remove the soil effectively after a period of 60 seconds. These results demonstrate that not only does the addition of the alkali soluble emulsion polymer result in lower particle size and misting, the compositions containing the polymers further maintain effective soil removal.

Example 5

Foam Stability. The foam stability of various cleaning compositions were evaluated in the presence of soil using a cylinder rotating device. This testing was performed to determine the impact of the presence of soil on foam stability of each of the detergent compositions. The compositions tested included the Control formulation from Example 2, as well as the Control formulation+750 ppm of alkali soluble emulsion polymer, and the Control formulation+1000 ppm alkali soluble emulsion polymer.

Procedure 1. 40 mL of test formulation was added to a 250 mL graduated cylinder. Step repeated for each formulation tested.
2. Allowed all cylinders and test solutions to reach room temperature. This step is important as warmer solutions will yield higher foam heights.
3. Soil was liquefied by placing on a hot plate at 200° F. to create a homogenous liquid.
4. All cylinders were stopped and placed in a foam cylinder apparatus and securely tightened.
5. Rotated cylinders at 30 rpm for 2 minutes. After 2 minutes, the initial foam height was recorded (mL of foam) by measuring the difference between the foam height and the liquid height.

6. 2 drops of test soil were added using a disposable pipette to the center of the cylinder, avoiding letting the soil drip down the sides of the cylinders.
7. Rotated the cylinders at 30 rpm for 2 minutes and recorded the foam height. Add 2 more drops of test soil using a disposable pipette. Each time soil was added, the cylinders were rotated at 30 rpm for 2 minutes and the foam height was measured.

Figure 6:
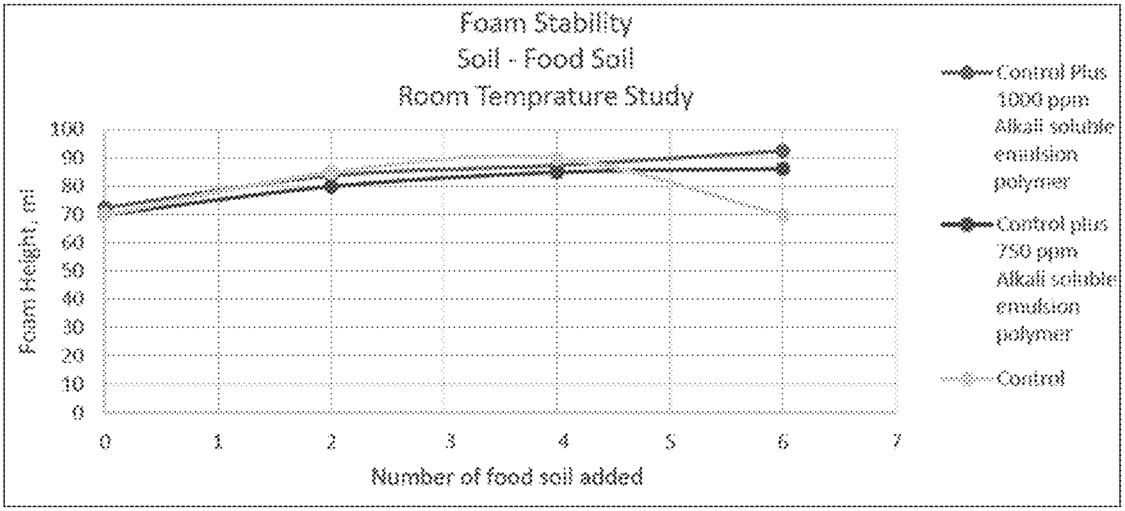
FIG. 6 shows the foam stability of a control cleaning composition in comparison to exemplary cleaning compositions of the present application containing alkali soluble emulsion polymers at various concentrations, with respect to the number of food soils added to the compositions.

The results of the foam stability test are shown in FIG. 6 where the "number of food soil added" corresponds with the number of drops of soil added during the testing. As shown in the figure, the addition of the alkali soluble emulsion polymer did not negatively impact foam in the presence of soil. In fact, as the number of food soil added increased, the formulations containing the alkali soluble emulsion polymers demonstrated superior foam stability compared to the control.

Example 6

Foam Behavior. Various cleaning compositions were further evaluated to monitor the foam behavior of the compositions on vertical surfaces. The compositions evaluated included the Control formulation from Example 2, as well as the Control formulation+750 ppm of alkali soluble emulsion polymer, and the Control formulation+1000 ppm alkali soluble emulsion polymer. Each test product was sprayed onto a polymerized corn oil coupon with 3 sprays at room temperature. The initial foam behavior was visually monitored, and a photograph was captured for each test composition at 5 seconds following the spray for visual observation. The images are shown in FIGS. 7A, 7B, and 7C.

Figure 7A:
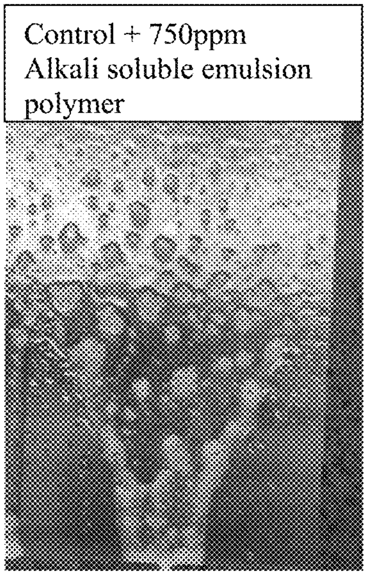
FIG. 7A shows the foam behavior of an exemplary cleaning composition comprising a Control formulation plus 750 ppm of alkali soluble emulsion polymer on a vertical surface.
Figure 7B:
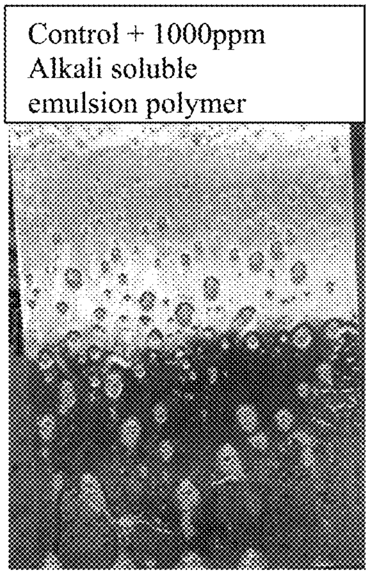
FIG. 7B shows the foam behavior of an exemplary cleaning composition comprising a Control formulation plus 1000 ppm of alkali soluble emulsion polymer on a vertical surface.
Figure 7C:
FIG. 7C shows the foam behavior of a Control formulation that does not contain alkali soluble emulsion polymers on a vertical surface.

As shown in FIG. 7A-7C, the foam behavior of the compositions of the present application exhibited complete coverage of the surface with suitable thickness for beneficially achieving vertical cling of the vertical surface. Even after a period of 5 seconds, the current cleaning composition remains on the vertical surface. These results demonstrate that the addition of the alkali soluble emulsion polymer maintain good foam behavior on a vertical surface.

Example 7

Alternative polymers were evaluated for inclusion in the compositions of the present application instead of the alkali soluble emulsion polymer of the present application. Alternative polymers such as hydrophobically-modified alkali soluble emulsion polymers (HASE) and hydrophobically-modified ethoxylated urethane polymers (HEUR) were evaluated. Examples of HASE polymers include polymers such as Acusol 805S, Acusol 820, and Acusol 823. Examples of HEUR polymers include polymers such as Acusol 880. The polymers were added to the Control formulation as shown in Example 2. The results are shown in Table 3, observing the compatibility of the inclusion of the polymers as well as the spray pattern of the polymers.

TABLE 3

| Polymer | Type of Polymer | Observations |
|---|---|---|
| ACUSOL ™ 805S ACUSOL ™ 820 ACUSOL ™ 823 | Hydrophobically-modified Alkali Soluble Emulsion Polymer (HASE) | (1) Addition of polymer into the control formula led to a cloudy solution. Polymer was not soluble into an alkaline based heavy-duty degreaser. (2) Spray pattern of the solution was analyzed, and no mist reduction observed. |
| ACUSOL ™ 880 | Hydrophobically-modified Ethoxylated Urethane polymer (HEUR) | (1) Addition of polymer into the control formula led to a cloudy solution. Polymer was not soluble into an alkaline based heavy-duty degreaser. Spray pattern of the solution was analyzed, and no mist reduction observed. |
| ACUSOL ™ 830 | Alkali Soluble Emulsion polymer (ASE) | (1) The addition of polymer into the control formula led to a cloudy solution. Polymer is not soluble into an alkaline based heavy-duty degreaser. (2) Spray pattern of the solution was analyzed, and no mist reduction observed |

The results from Table 3 demonstrate that other types of polymers, including HASE and HEUR polymers, were not compatible for inclusion in an alkaline based heavy-duty degreaser composition in comparison to the alkali soluble emulsion polymer of the present application. Further, ACUSOL™ 830 is only stable in an pH environment of between 6.5 and 12.5; as the embodiment of sprayable cleaning composition in this example was prepared with a pH of about 13.5, the ACUSOL™ 830 suffered stability problems. However, in a slightly less alkaline formulation, it is expected that this alkali soluble polymer would be suitable for the sprayable cleaning compositions. Despite this other alkali soluble emulsion polymers have demonstrated suitability for the sprayable cleaning compoistions. Therefore, the inclusion of the polymer of the present application demonstrates superior and unexpected benefits in both solubilizing in heavy-duty degreaser compositions and reducing misting, leading to beneficial properties for use as a sprayable alkaline composition.

Example 8

To confirm the nature of the alkali soluble emulsion polymer's emulsion (i.e., a water-based emulsion and not an inverse emulsion) conductivity testing was performed. The ACUSOL™ 810A was compared against a known inverse emulsion polymer (Nalco 625). Conductivity of Nalco 625 and ACUSOL™ 810A were measured using Thermo Scientific Orion Star A215 pH/Conductivity Benchtop meter. The reading was completed at room temperature. The electrode was prepared according the manual. Sensor was rinsed with distilled water and blotted gently with a lint-free tissue to remove excess water and placed into the sample. Measurement was taken when reading water stabilized. The results are presented in Table 4.

TABLE 4

| Emulsion Polymer | Conductivity Measurement |
|---|---|
| Nalco 625 | 98.34 μs/cm |
| ACUSOL ™ 810A | 18.89 ms/cm |

The results indicate that the ACUSOL™ 810A is a oil-in-water emulsion, not an inverse emulsion like Nalco 625 due to the higher conductivity of the ACUSOL™ 810A emulsion solution.

The inventions being thus described, it will be obvious that the same may be varied in many ways. Such variations are not to be regarded as a departure from the spirit and scope of the inventions and all such modifications are intended to be included within the scope of the following claims.

What is claimed is:

1. A method of cleaning a soiled surface using a sprayable cleaning composition comprising:

(a) contacting the soiled surface with the sprayable cleaning composition comprising:

from about 0.0035 wt. % to about 1 wt. % of an alkali soluble emulsion polymer, wherein the alkali soluble emulsion polymer is in an emulsion where the continuous phase is water or a water miscible liquid; wherein the alkali soluble emulsion polymer is stable at a pH of at least about 10;

an alkalinity source, wherein the alkalinity source is in a concentration sufficient to neutralize the alkali soluble emulsion polymer;

from about 0.1 wt. % to about 10 wt. % of a foaming agent; wherein the foaming agent comprises an anionic surfactant, a nonionic surfactant, an amphoteric surfactant, or a combination thereof; wherein the composition is free of cationic surfactant; and water;

wherein the sprayable cleaning composition reduces the formation of airborne aerosol particles having a micron size of less than about 10 when sprayed, and a use solution of the composition has a shear viscosity from about 1 to about 500 cPs; and (b) wiping the soiled surface to remove film and/or any soil.

2. The method of claim 1, wherein the alkalinity source comprises an organic or an alkali metal hydroxide; and wherein the alkalinity source is in a concentration from about 0.1 wt. % to about 15 wt. %.

3. The method of claim 1, wherein the foaming agent comprises a betaine, a sultaine, an amine oxide, an alkylpolyglucoside, a sulfated anionic surfactant, a sulfonated anionic surfactant, or a mixture thereof.

4. The method of claim 1, wherein the alkali soluble emulsion polymer has the structure

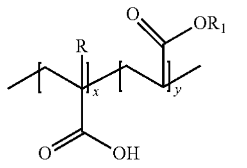

wherein x is between about 1 and about 10,000; wherein y is between about 1 and about 10,000; and wherein R comprises a hydrogen or alkyl group; and wherein $R_1$ comprises a hydrogen or alkyl group; and wherein the alkali soluble emulsion polymer is in an emulsion having an aqueous continuous phase.

5. The method of claim 1, wherein the composition has a pH from about 12 to about 14.

6. The method of claim 1, wherein the alkali soluble emulsion polymer has viscosity of greater than 10 cps and less than about 200 cps.

7. The method of claim 4, wherein the alkali soluble emulsion polymer is stable at a pH of greater than about 13.

8. The method of claim 1, wherein the composition further comprises a corrosion inhibitor in a concentration from about 0.01 wt. % to about 5 wt. %.

9. The method of claim 8, wherein the corrosion inhibitor comprises sodium gluconate, sodium glucoheptonate, and mixtures thereof.

10. The method of claim 1, wherein the composition further comprises a solvent in a concentration from about 0.01 wt. % to about 10 wt. %.

11. The method of claim 10, wherein the solvent comprises hydroxy substituted organic solvent selected from the group consisting of methanol, ethanol, propanol, isopropanol, ethylene glycol, diethylene glycol, propylene glycol, dipropylene glycol, propylene glycol methyl ether, propylene glycol ethyl ether, propylene glycol propyl ether, dipropylene glycol methyl ether, ethylene glycol methyl ether, ethyl glycol butyl ether, diethylene glycol butyl ether, monoethanol amine, monopropanol amine, diethanol amine, dipropanol amine, triethanol amine, tripropanol amine, and mixtures thereof.

12. The method of claim 1, wherein the composition further comprises a thickening agent in a concentration of between about 0.01 wt. % and about 10 wt. %.

13. The method of claim 12, wherein the thickening agent comprises Xanthan gum and is in a concentration of between about 0.01 wt. % and about 5 wt. %.

14. The method of claim 1, wherein the method further comprises:

(a) applying the sprayable cleaning composition with a sprayer comprising a spray head connected to a spray bottle; and (b) the spray head adapted to dispense the sprayable cleaning composition with reduced misting.

15. The method of claim 1, wherein the cleaning composition is produced in-line or in situ by combining the alkalinity source, alkali soluble emulsion polymer, foaming agent, and water, and wherein the dissolution requires less than 10 minutes to form a homogenous solution.

16. The method of claim 1, wherein the cleaning composition produces a total concentration of misting of particles having a micron size of 10 or less within a breathing zone of a user as measured in total number of particles per $cm^3$ of 60 particles/$cm^3$ or fewer.

17. The method of claim 1, wherein the contacting step uses a trigger sprayer.

18. The method of claim 14, wherein the applying step uses a trigger sprayer.

19. The method of claim 1, wherein said soil is a greasy soil or fat soil.

20. The method of claim 1, wherein the soiled surface is a non-horizontal surface and the cleaning composition exhibits less running on the non-horizontal surface than an acrylamide-based sprayable cleaning composition.

* * * * *